(12) United States Patent
Horita et al.

(10) Patent No.: US 12,192,752 B2
(45) Date of Patent: Jan. 7, 2025

(54) DETERMINATION DEVICE, DETERMINATION METHOD, AND DETERMINATION PROGRAM FOR SWITCHING NETWORKS BASED ON A PLURALITY OF LEARNING MODELS

(71) Applicant: Sony Group Corporation, Tokyo (JP)

(72) Inventors: Koki Horita, Tokyo (JP); Toshiya Ikenaga, Tokyo (JP); Daichi Ueura, Tokyo (JP); Takeshi Itagaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 300 days.

(21) Appl. No.: 17/633,579

(22) PCT Filed: Apr. 23, 2020

(86) PCT No.: PCT/JP2020/017570
§ 371 (c)(1),
(2) Date: Feb. 8, 2022

(87) PCT Pub. No.: WO2021/038961
PCT Pub. Date: Mar. 4, 2021

(65) Prior Publication Data
US 2022/0312289 A1 Sep. 29, 2022

(30) Foreign Application Priority Data
Aug. 30, 2019 (WO) .................. PCT/JP2019/034252

(51) Int. Cl.
*H04W 72/04* (2023.01)
*H04W 36/32* (2009.01)
(Continued)

(52) U.S. Cl.
CPC ...... *H04W 36/324* (2023.05); *H04W 36/1446* (2023.05); *H04W 36/304* (2023.05); *H04W 84/12* (2013.01)

(58) Field of Classification Search
CPC ........... H04W 36/14; H04W 36/00837; H04W 36/30; H04W 36/32; H04W 36/304;
(Continued)

(56) References Cited

U.S. PATENT DOCUMENTS

| 10,271,258 B2 * | 4/2019 | Van Der Velde ..... H04W 36/04 |
| 2004/0147223 A1 * | 7/2004 | Cho ........................ H04L 12/66 455/552.1 |

(Continued)

FOREIGN PATENT DOCUMENTS

| CN | 1732708 A | 2/2006 |
| CN | 102271375 A | 12/2011 |

(Continued)

OTHER PUBLICATIONS

Fang Zhu et al: "Optimizations for vertical handoff decision algorithms", Wireless Communications and Networking Conference, 2004. WCNC. 2004 IEEE Atlanta, GA, USA, Mar. 21-25, 2004, Piscataway, NJ, USA, IEEE, vol. 2, Mar. 21, 2004 (Mar. 21, 2004), p. 867-872, XP010708246, DOI: 10.1109/WCNC.2004.1311300 ISBN: 978-0-7803-8344-9.

(Continued)

*Primary Examiner* — Mahbubul Bar Chowdhury
(74) *Attorney, Agent, or Firm* — XSENSUS LLP

(57) ABSTRACT

A determination device according to the present application includes a communication unit, an acquisition unit, and a determination unit. The communication unit selectively connects to and communicates with a plurality of communication networks. The acquisition unit acquires sensor information detected by a mobile communication device used by (Continued)

a user and communication information indicating a state of communication quality to each communication network. The determination unit determines whether to switch to another communication network among the plurality of communication networks, on the basis of the sensor information and the communication information acquired by the acquisition unit.

5 Claims, 24 Drawing Sheets

(51) Int. Cl.
*H04W 36/14* (2009.01)
*H04W 36/30* (2009.01)
*H04W 84/12* (2009.01)

(58) Field of Classification Search
CPC .......... H04W 36/324; H04W 36/0083; H04W 36/1446; H04W 84/12
See application file for complete search history.

(56) References Cited

U.S. PATENT DOCUMENTS

| | | |
|---|---|---|
| 2006/0135150 A1 | 6/2006 | Oh |
| 2010/0329209 A1* | 12/2010 | Akselsen ............ H04W 36/302 370/401 |
| 2016/0157170 A1* | 6/2016 | Daoud Triki ......... H04W 48/16 370/329 |
| 2017/0272995 A1 | 9/2017 | Kim |
| 2018/0234900 A1 | 8/2018 | Sankaranarayan |
| 2019/0082370 A1 | 3/2019 | Alfred |
| 2019/0342943 A1* | 11/2019 | Rice ..................... H04B 1/0053 |
| 2019/0364492 A1* | 11/2019 | Azizi ................ H04W 52/0264 |

FOREIGN PATENT DOCUMENTS

| | | |
|---|---|---|
| CN | 105264959 A | 1/2016 |
| CN | 105766030 A | 7/2016 |
| CN | 107409338 A | 11/2017 |
| CN | 108391298 A | 8/2018 |
| CN | 109068350 A | 12/2018 |
| EP | 1585354 A1 | 10/2005 |
| EP | 2410789 A1 | 1/2012 |
| JP | 2004-208001 A | 7/2004 |
| JP | 2007-509590 A | 4/2007 |
| JP | 2009-503914 A | 1/2009 |
| JP | 2010-523024 A | 7/2010 |
| JP | 2014-36317 A | 2/2014 |
| JP | 2014110450 A | 6/2014 |
| KR | 20140064314 A | 5/2014 |
| WO | 2009/110103 A1 | 9/2009 |
| WO | WO-2019013248 A1 | 1/2019 |
| WO | WO-2019013446 A1 | 1/2019 |

OTHER PUBLICATIONS

International Search Report and Written Opinion mailed on Jul. 14, 2020, received for PCT Application PCT/JP2020/017570, Filed on Apr. 23, 2020, 9 pages including English Translation.

* cited by examiner

FIG.7

| DATA ID | SENSOR INFORMATION | | | | | CELLULAR INFORMATION | | | Wi-Fi INFORMATION | | | CORRECT LABEL | ... |
|---|---|---|---|---|---|---|---|---|---|---|---|---|---|
| | ACCELERATION | MAGNETISM | DIRECTION | ATMOSPHERIC PRESSURE | POSITION | 5G mmW | LTE | ... | RTT | DISCONNECTION PROBABILITY | ... | | ... |
| D001 | ACCELERATION #1 | MAGNETISM #1 | DIRECTION #1 | ATMOSPHERIC PRESSURE #1 | POSITION #1 | 5G mmW #1 | LTE#1 | ... | RTT#1 | DISCONNECTION PROBABILITY #1 | ... | 1 | ... |
| D002 | ACCELERATION #2 | MAGNETISM #2 | DIRECTION #2 | ATMOSPHERIC PRESSURE #2 | POSITION #2 | 5G mmW #2 | LTE#2 | ... | RTT#2 | DISCONNECTION PROBABILITY #2 | ... | 0 | ... |
| D003 | ACCELERATION #3 | MAGNETISM #3 | DIRECTION #3 | ATMOSPHERIC PRESSURE #3 | POSITION #3 | 5G mmW #3 | LTE#3 | ... | RTT#3 | DISCONNECTION PROBABILITY #3 | ... | 1 | ... |
| ... | ... | ... | ... | ... | ... | ... | ... | ... | ... | ... | ... | ... | ... |

FIG.8

| MODEL ID | MODEL (CALCULATION FORMULA) |
|---|---|
| M1 | MODEL #1 |
| M2 | MODEL #2 |
| ... | ... |

122

DETERMINATION DEVICE, DETERMINATION METHOD, AND DETERMINATION PROGRAM FOR SWITCHING NETWORKS BASED ON A PLURALITY OF LEARNING MODELS

CROSS-REFERENCE TO RELATED APPLICATIONS

The present application is based on PCT filing PCT/JP2020/017570, filed Apr. 23, 2020, which is based on PCT filing PCT/JP2019/034252, filed Aug. 30, 2019, the entire contents of each are incorporated herein by reference.

FIELD

The present invention relates to a determination device, a determination method, and a determination program.

BACKGROUND

Conventionally, there is known technology for switching and using a wireless local area network (LAN) communication function conforming to IEEE802.11 and a cellular communication function conforming to a communication standard such as 4G or long term evolution (LTE) (see Patent Literatures 1 to 3).

CITATION LIST

Patent Literature

Patent Literature 1: JP 2007-509590 A
Patent Literature 2: JP 2009-503914 A
Patent Literature 3: JP 2010-523024 A

SUMMARY

Technical Problem

The conventional technology has room for improvement in determining switching of a communication network. For example, in the conventional technology, switching of the communication network is performed according to a predetermined switching standard. However, there is a case where a communication quality of the communication network of the switching destination is not necessarily good, and it is not always possible to appropriately determine the switching of the communication network.

The present application has been made in view of the above and an object thereof is to appropriately determine switching of a communication network.

Solution to Problem

A determination device according to the present disclosure includes: a communication unit that selectively connects to and communicates with a plurality of communication networks; an acquisition unit that acquires sensor information detected by a mobile communication device used by a user and communication information indicating a state of communication quality to each communication network; and a determination unit that determines whether to switch to another communication network among the plurality of communication networks, on the basis of the sensor information and the communication information acquired by the acquisition unit.

BRIEF DESCRIPTION OF DRAWINGS

FIG. 7 is a diagram illustrating an example of a past communication-related information storage unit according to an embodiment.
FIG. 8 is a diagram illustrating an example of a model information storage unit according to an embodiment.

DESCRIPTION OF EMBODIMENTS

Figure 1:
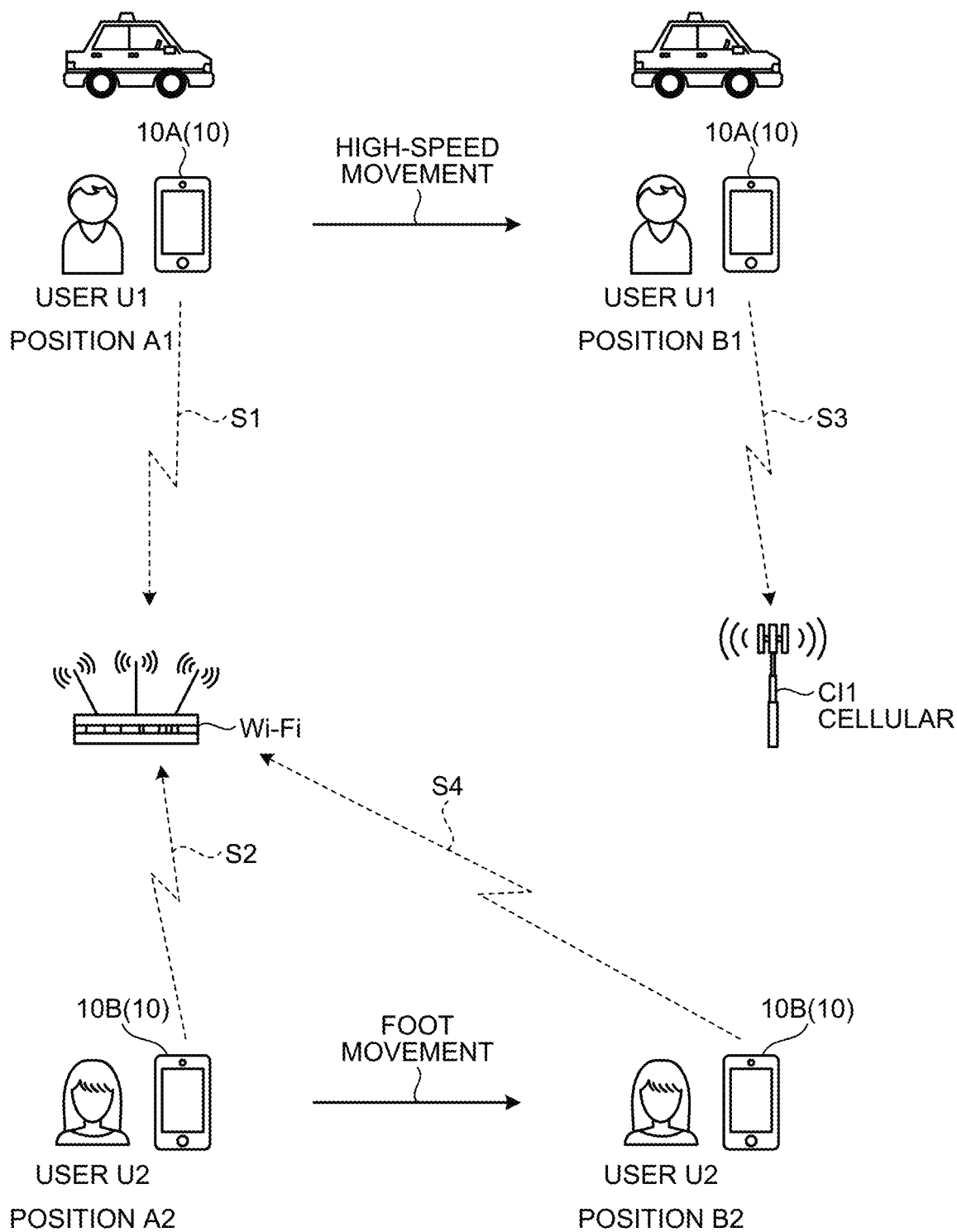
FIG. 1 is a diagram illustrating an example of information processing according to an embodiment.

Hereinafter, modes (hereinafter, referred to as "embodiments") for implementing a determination device, a determination method, and a determination program according to the present application will be described in detail with reference to the drawings. Note that the determination device, the determination method, and the determination program according to the present application are not limited by the embodiments. In the following embodiments, the same parts are denoted by the same reference numerals, and redundant description will be omitted.

The present disclosure will be described according to the following item order.

1. Configuration of information processing system
2. Example of information processing
3. Variations of processing
3-1. Data collection
3-2. Mounting of plurality of learning models
3-3. Switching
3-4. Correct label
3-5. Switching timing
3-6. External sensor
3-7. Other sensor information
3-8. Download
3-9. Terminal device, information providing device, and determination device
3-10. Learning model
3-11. Combination of communication networks
4. Configuration of terminal device
5. Configuration of information providing device
6. Configuration of determination device
7. Details of determination device
8. Flow of information processing
9. Modification
9-1. First modification (another configuration example of terminal device)
9-2. Second modification (millimeter wave communication)
9-3. Third modification (switching of bearer according to application)
9-4. Fourth modification (score calculation for each bearer)
9-5. Fifth modification (download trained data according to location)
9-6. Sixth modification (score calculation 1 on cloud)
9-7. Seventh modification (score calculation 2 on cloud)
9-8. Others (determination other than determination by score)
10. Hardware configuration
11. Others

EMBODIMENT

1. Configuration of Information Processing System

Figure 3:
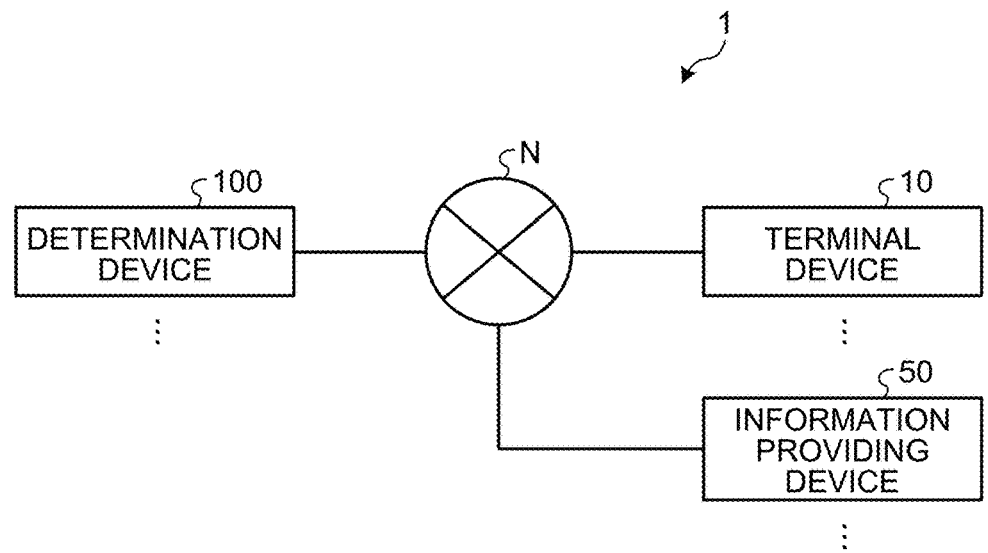
FIG. 3 is a diagram illustrating a configuration example of an information processing system according to an embodiment.

Before the description of FIG. 1, a configuration of an information processing system 1 will be described using FIG. 3. FIG. 3 is a diagram illustrating a configuration example of an information processing system according to an embodiment. As illustrated in FIG. 3, the information processing system 1 includes a terminal device 10, an information providing device 50, and a determination device 100. The terminal device 10, the information providing device 50, and the determination device 100 are connected communicably by a wired or wireless system via a predetermined communication network (network N). FIG. 3 is a diagram illustrating a configuration example of an information processing system according to an embodiment. Note that the information processing system 1 illustrated in FIG. 3 may include a plurality of terminal devices 10, a plurality of information providing devices 50, and a plurality of determination devices 100.

The terminal device 10 is an information processing device used by a user. The terminal device 10 may be any device as long as processing in the embodiment can be realized. Further, the terminal device 10 may be a device such as a smartphone, a tablet terminal, a notebook PC, a desktop PC, a mobile phone, or a PDA. In an example illustrated in FIG. 1, a case where the terminal device 10 is a smartphone is illustrated.

The information providing device 50 is, for example, an information processing device such as a PC or a work station (WS), and is used to provide past communication-related information to the determination device 100.

The determination device 100 is used to determine whether to switch to another communication network. The determination device 100 is, for example, an information processing device such as a PC or a work station (WS), and performs processing on the basis of information transmitted from the terminal device 10 or the like via the network N. The determination device 100 determines switching of the communication network of the terminal device 10, on the basis of communication information or sensor information.

2. Example of Information Processing

In FIG. 1, during Wi-Fi connection of the terminal device 10 used by the user, the determination device 100 determines whether to switch the connection of the communication network of the terminal device 10 from Wi-Fi to another communication network, on the basis of information detectable by the terminal device 10 and information regarding connected Wi-Fi. Specifically, the determination device 100 determines whether to switch to another communication network by using a learning model (for example, a neural network) for inferring a deterioration state of a communication quality of Wi-Fi.

Wi-Fi according to the embodiment is a wireless LAN network via a wireless LAN base station. Further, another communication network according to the embodiment may be any communication network as long as it is a communication network connectable to the terminal device 10 and is a communication network other than the connected communication network. For example, another communication network according to the embodiment may be a cellular network via a cellular communication base station or may be a wireless LAN network. Note that it is assumed that the number of cellular communication base stations that can communicate with the terminal device 10 is not limited. In other words, the terminal device 10 may be in a state connectable to one cellular network or may be in a state connectable to two or more cellular networks. In addition, it is assumed that the plurality of communication networks according to the embodiment include a wireless LAN network and a cellular network. Note that the communication network according to the embodiment may be a communication network conforming to the fifth-generation communication standard, and the cellular network according to the embodiment may be a communication network conforming to the fifth-generation communication standard.

The terminal device 10 according to the embodiment is an example of a mobile communication device. The mobile communication device may be any mobile communication device. For example, the mobile communication device may be a communication device that moves with a user. Specifically, the mobile communication device may be a communication device that can be moved by being carried or worn by the user, such as a smartphone, a smart watch, or a business camera. For example, the mobile communication device may be a communication device that moves according to the operation of the user. Specifically, the mobile communication device may be a communication device such as a drone that is movable according to the operation of the user. FIG. 1 illustrates a case where the mobile communication device is a smartphone as an example.

Hereinafter, an outline of determination processing according to the embodiment will be described using FIG. 1. FIG. 1 illustrates two cases of a case where the user moves at a high speed by a mobile object such as a vehicle and a case where the user does not move at a high speed. Note that the case where the user moves at a high speed may be a case where the user moves at any speed as long as the user moves at a speed satisfying a predetermined condition. Here, the speed satisfying the predetermined condition may include not only a speed based on the state of movement of the user but also a speed based on the state of movement of the user and the state of communication of the communication network. For example, the speed satisfying the predetermined condition may be a speed based on the state of movement of the user in a case where the communication quality of the communication network satisfies a predetermined condition. As a specific example, when the communication quality of the communication network deteriorates to fall below a predetermined standard even if the user walks on foot, the speed satisfying the predetermined condition may be a speed at which the user walks on foot. On the other hand, when the communication quality of the communication network does not fall below the predetermined standard even if the user moves at a high speed on a train, it may be determined that the user does not move at a speed satisfying the predetermined condition. For example, when a case where the user is moving by a train is taken as an example, the speed satisfying the predetermined condition may be the speed of the user in a case where the train accelerates so that an RTT value for a communication network connected to the terminal device 10 cannot continue to be a predetermined threshold or more in a certain moving section. In addition, FIG. 1 illustrates the case where the user moves by the vehicle as the mobile object. However, the mobile object is not limited to the vehicle and may be any mobile object such as a mobile object in public transportation such as an airplane or a train, or a mobile object that automatically moves such as an elevator or an escalator. Furthermore, the case where the user does not move at a high speed is, for example, a case where the user moves on foot. Note that the case where the user does not move at a high speed includes a case where the user stays at a predetermined point or a fixed point, a case where the user does not move, and the like.

In FIG. 1, a user U1 shows an example of a user who moves at a high speed, and a user U2 shows an example of a user who does not move at a high speed. It is assumed that the user U1 moves from a position A1 to a position B1 by the vehicle. It is assumed that the user U2 moves from a position A2 to a position B2 on foot. In addition, it is assumed that a terminal device 10A used by the user U1 and a terminal device 10B used by the user U2 are connected to Wi-Fi immediately before the user starts moving. That is, it is assumed that, when the user U1 is at the position A1, the terminal device 10A is connected to Wi-Fi (S1), and when the user U2 is at the position A2, the terminal device 10B is connected to Wi-Fi (S2). In addition, it is assumed that, when the user U1 moves to the position B1 at a high speed, the terminal device 10A switches from Wi-Fi to communication to the cellular network (S3). Specifically, the determination device 100 predicts a deterioration state of communication quality of Wi-Fi and instructs the terminal device 10A to switch to communication to another communication network. In addition, it is assumed that, when the user U2 moves to the position B2, the terminal device 10B does not switch to communication to the cellular network (S4) while being connected to Wi-Fi.

Hereinafter, an example of determination processing according to the embodiment will be described using FIG. 2. Hereinafter, processing in which the determination device 100 generates a learning model that outputs a degree of deterioration of the Wi-Fi connection by using past information regarding the communication network (hereinafter, appropriately referred to as "past communication-related information") will be described. For example, the determination device 100 generates a learning model using past communication-related information in a terminal device (hereinafter, appropriately referred to as "another terminal device") used by another user. Note that another user may include a user to be evaluated (in FIG. 1, a user U1). That is, the determination device 100 may generate a learning model that outputs a degree of deterioration of Wi-Fi connection of the terminal device 10A using past communication-related information of the user U1. In addition, another user may be one user or a plurality of users.

The determination device 100 acquires past communication-related information LINF1 (Step S101). For example, the determination device 100 acquires the past communication-related information LINF1 transmitted from the information providing device 50. In order to simplify the description, FIG. 2 illustrates an example in which the determination device 100 acquires the past communication-related information LINF1 transmitted from the information providing device 50. Note that the past communication-related information LINF1 includes sensor information that can be acquired on another terminal device, information related to Wi-Fi that can be acquired on another terminal device, and information related to a cellular network that can be acquired on another terminal device (hereinafter, appropriately referred to as "cellular information"). Each piece of information included in the past communication-related information LINF1 will be described below.

The determination device 100 acquires information that can be detected on another terminal device. For example, the determination device 100 acquires sensor information that is detected by a sensor provided inside another terminal device. Note that there are mainly two types of sensor information as sensor information according to the embodiment. Specifically, the sensor information according to the embodiment includes sensor information for estimating a state of the user in real time and sensor information for inferring (predicting) the state of the user in a near future.

The determination device 100 acquires, for example, sensor information for estimating information regarding a movement of another user as sensor information for estimating a state of another user in real time. Specifically, the determination device 100 acquires sensor information indicating a position or a movement speed of another user. As a specific example, the determination device 100 acquires sensor information detected by acceleration, magnetism, a direction, atmospheric pressure, a position sensor, or the like. Note that the determination device 100 may acquire sensor information detected by any sensor as long as the sensor is a sensor that can be used to estimate information regarding the movement of another user, without being limited to the above example.

The determination device 100 acquires, for example, sensor information for estimating context information of another user as sensor information for inferring a state of another user. For example, the determination device 100 acquires sensor information for inferring a state of another user on the basis of past information. For example, the determination device 100 acquires sensor information for inferring an action of another user. Specifically, the determination device 100 acquires sensor information for inferring an action of another user such as moving on foot, moving by a train, moving by a vehicle, going up and down stairs, or going up and down by an elevator. As a specific example, the determination device 100 acquires sensor information detected by acceleration, time, a direction, atmospheric pressure, a position, a pedometer, and the like. Note that the determination device 100 may acquire sensor information detected by any sensor as long as the sensor is a sensor that can be used to infer the action of another user, without being limited to the above example. In addition, the determination device 100 may acquire action information inferred from the acquired sensor information. For example, the determination device 100 may acquire the action information of the user from a change amount of the sensor information. As a specific example, the determination device 100 may calculate a movement speed or an acceleration state of the user from the change amount of the acceleration or the position information. As a result, the determination device 100 can predict that Wi-Fi performance will deteriorate after several seconds, for example.

The determination device 100 acquires information of a parameter related to each sensor as the sensor information. For example, the determination device 100 acquires information of parameters related to acceleration, magnetism, a direction, atmospheric pressure, a position, time, a pedometer sensor, and the like.

As a result, the determination device 100 can grasp the movement state of the user by utilizing the sensor information, and can select an optimum bearer according to the movement state of the user by using the sensor information for switching determination. For example, the determination device 100 may select to continue using cellular in a high-speed mobile communication state such as train travel.

In addition, the determination device 100 acquires information regarding Wi-Fi connected to another terminal device. For example, the determination device 100 acquires parameter information related to Wi-Fi. For example, the determination device 100 acquires information such as Link-Speed and a packet communication state as parameters related to Wi-Fi. As a specific example, the determination device 100 acquires, as the parameters related to Wi-Fi, a PHY protocol type (a/b/g/n/ac/ax), a MAC protocol type (d/e/h/i/j/k/p/v/w/y/z), signal strength (RSSI), a used frequency, SSID, BSSID, an allocated bandwidth, RTT of a radio section for AP, an S/N ratio, a frequency spectrum, the number of terminals in the same basic service set (BSS), an authentication method, the number of MIMO layers, the number of signal collisions, the number of RTS/CTS per unit time, the number of probe requests, the number of beacons received, a reception/transmission packet counter value, the number of transmission successes, the number of reception successes, the number of retransmissions, the number of frame failures, the number of interface errors, a length of time (CCA Busy Time) determined by a radio machine to be busy by carrier sense (for example, a length of time within a predetermined section), a length of time (Contention Time) taken for packet transmission by carrier sense multiple access/collision avoidance (CSMA/CA), a length of time (Radio On Time) for which the radio machine is operating (for example, a length of time within a predetermined section), a length of time (Tx Time) for which the radio machine is transmitting a packet (for example, a length of time within a predetermined section), a length of time (Rx Time) for which the radio machine is receiving a packet (for example, a length of time within a predetermined section), the number (Tx Lost Count) of lost transmission packets without being successfully transmitted (for example, the number of lost transmission packets within a predetermined section), and information such as the number of frames existing in a queue of a transmission buffer of Wi-Fi (for example, the number of packets staying in the transmission buffer and a length of time for which packets stay in the transmission buffer). Note that the determination device 100 may acquire any parameter as long as the parameter is information related to Wi-Fi, without being limited to the above example. In addition, the determination device 100 may acquire combinations of the plurality of parameters described above as parameters, or may acquire a result obtained by processing the combinations of the plurality of parameters described above as the parameters. Note that Contention Time may be a section average within a predetermined section, a section minimum, or a section maximum. Note that the number of Packets staying in the transmission buffer may be an instantaneous value, a section average value within a predetermined section, or an integrated value at a time within the predetermined section. Note that an example of a calculation formula of the integrated value at the time within the predetermined section is expressed by the following formula (1) when a target parameter is x(t) and a target time section is $t_1$ to $t_2$. In addition, the length of time for which the packets stay in the transmission buffer may be a section average within the predetermined section.

$$\int_{t_1}^{t_2} x(t)dt$$

Further, the determination device 100 acquires information regarding a cellular network connectable to another terminal device. For example, the determination device 100 acquires information of parameters related to the cellular network. As a specific example, the determination device 100 acquires, as the parameters related to the cellular network, the number of Component Carriers, an average rate (Modulation and Coding Scheme (MCS)), Capability (LTE/HSPA+/GSM), signal strength, the number of MIMO layers, the number of communication allocation times, the number of actual resource blocks, a reception/transmission packet counter value, the number of transmission successes, the number of reception successes, the number of frame retransmissions (MAC), the number of RLC, the number of interface errors, a throughput (PHY/IP), cell information (a cell ID, transmission power of DL reference signal, adjacent cell information, a cell capacity, and backbone band information), AsuLvel, Cqi, dbm, Level, RSRP, RSSI, RSSNR, TimingAdvance, a communication plan of a user, and information such as a remaining communicable capacity in a month in the communication plan. Note that the determination device 100 may acquire any parameter as long as the parameter is information related to the cellular network, without being limited to the above example.

In addition, the determination device 100 stores the acquired past communication-related information LINF1. For example, the determination device 100 stores the acquired information in a predetermined storage unit. For example, the determination device 100 stores the acquired information in a past communication-related information storage unit 121.

Subsequently, the determination device 100 generates a model that outputs a degree of deterioration of Wi-Fi connection (Step S102). For example, the determination device 100 generates the model that outputs the degree of deterioration of the Wi-Fi connection using, as input information, both or one of sensor information that can be acquired on another terminal device and information related to Wi-Fi. For example, the determination device 100 generates the model that outputs the degree of deterioration of the Wi-Fi connection using both or one of parameters related to a sensor and parameters related to Wi-Fi as the input information. In addition, the determination device 100 generates a learned model by assigning a correct label (flag) at timing of switching the communication network by using a part or all of the acquired information. For example, the determination device 100 may generate the model by assigning the correct label at timing at which an RTT value exceeds a predetermined threshold or timing at which the Wi-Fi connection is disconnected due to a weak current and performing learning. Note that the timing at which the determination device 100 assigns the correct label is not limited to this example. For example, the determination device 100 may generate a model by assigning a correct label at timing at which the number of packets staying in the transmission buffer becomes equal to or larger than a predetermined threshold, timing at which a length of time in which the packets stay in the transmission buffer becomes equal to or larger than a predetermined threshold, or timing at which the number of lost packets without successful transmission of the transmission buffer becomes equal to or larger than a predetermined threshold and performing learning. In addition, the determination device 100 may combine the plurality of conditions, assign a correct label at timing at which all of the plurality of conditions are satisfied, and perform learning, thereby generating a model. Here, the correct label indicates timing at which the communication network should be switched. Specifically, the correct label indicates timing at which it is determined that the communication network should be switched on the basis of the past communication-related information. In FIG. 2, the determination device 100 assigns a label "1" as a correct label at timing at which the communication network should be switched, and assigns a label "0" as an incorrect label not to be a correct label at timing at which the communication network should not be switched. Note that the determination device 100 may acquire information regarding timing at which the communication network should be switched or information regarding timing at which the communication network should not be switched, on the basis of the label "1" or the label "0". For example, the determination device 100 may acquire the past communication-related information corresponding to the timing at which the communication network should be switched or the past communication-related information corresponding to the timing at which the communication network should not be switched. In the example illustrated in FIG. 2, the determination device 100 generates a model M1 using the information stored in the past communication-related information storage unit 121. Note that there are two types of models generated by the determination device 100. Specifically, the determination device 100 generates a model of a corresponding type according to the type of the sensor information.

The determination device 100 generates a model that outputs the degree of deterioration of the Wi-Fi connection in real time. For example, the determination device 100 generates a model that outputs the degree of deterioration of the Wi-Fi connection in real time by using sensor information for estimating the state of another user in real time. For example, the determination device 100 generates a model that outputs the degree of deterioration of the Wi-Fi connection related to the movement of another user in real time by using sensor information for estimating information related to the movement of another user.

The determination device 100 generates a model that outputs a degree of deterioration of the Wi-Fi connection in the near future. For example, the determination device 100 generates a model that outputs a degree of deterioration of Wi-Fi connection after several seconds. For example, the determination device 100 generates a model that outputs a degree of deterioration of the Wi-Fi connection in the near future by using sensor information for inferring the state of another user. For example, the determination device 100 generates a model that outputs the degree of deterioration of the Wi-Fi connection in the near future related to the action of another user by using sensor information for inferring the action of another user.

It is known that it is difficult to predict (determine) the degree of deterioration of the Wi-Fi connection of the terminal device 10 at a certain point of time unless a communication state (for example, an error rate, a throughput, and the like) is measured by actually transmitting a communication packet. This is because the deterioration state of the Wi-Fi connection is a result of a combination of various factors, and may change from moment to moment. For example, there is deterioration such as deterioration due to weak radio waves of radio, deterioration due to an influence of radio waves of other wireless communication devices, and deterioration due to the high-speed operation of mobile communication devices, and it is difficult to determine the current deterioration state. Moreover, it is still difficult to predict a deterioration state of the Wi-Fi connection in the future.

The determination device 100 can infer a degree of deterioration of the current or future Wi-Fi connection without actually transmitting the communication packet and measuring the communication state. As a result, for example, in the case of the terminal device 10 having a plurality of bearers of Wi-Fi and mobile communication, when the deterioration state of the current or future Wi-Fi connection is detected and the deterioration of Wi-Fi is determined, the determination device 100 can realize comfortable communication on the terminal device 10 by switching the bearer from Wi-Fi to the mobile communication.

The determination device 100 may output information regarding the RTT or information regarding disconnection of the Wi-Fi connection as information indicating the degree of deterioration of the Wi-Fi connection. For example, the determination device 100 outputs a score or a value of the RTT. For example, the determination device 100 outputs a score or a value indicating the disconnection probability of the Wi-Fi connection as the information regarding the disconnection of the Wi-Fi connection. Note that the determination device 100 may output any information as long as the information is information indicating the degree of deterioration of the Wi-Fi connection, without being limited to the above example.

The determination device 100 stores the generated model M1. For example, the determination device 100 stores the generated model M1 in a predetermined storage unit. For example, the determination device 100 stores the generated model M1 in a model information storage unit 122.

The processing in which the determination device 100 generates the learning model that outputs the degree of deterioration of the Wi-Fi connection has been described above.

The determination device 100 acquires communication-related information TINF1 (Step 103). The determination device 100 acquires the communication-related information TINF1 transmitted from the terminal device 10 used by the user to be evaluated. Note that the communication-related information TINF1 includes sensor information that can be acquired by the terminal device 10, information related to Wi-Fi that can be acquired by the terminal device 10, and information related to a cellular network that can be acquired by the terminal device 10. Since the communication-related information TINF1 includes information similar to the past communication-related information LINF1, the description thereof will be omitted.

The determination device 100 inputs the sensor information and the information related to Wi-Fi in the acquired communication-related information TINF1 to the model M1 (Step S104). Specifically, the determination device 100 inputs a parameter related to the sensor and a parameter related to Wi-Fi to the model M1.

The determination device 100 outputs information indicating the degree of deterioration of the Wi-Fi connection (Step S105). In the example illustrated in FIG. 2, the determination device 100 outputs a score indicating a communication quality as the information indicating the degree of deterioration of the Wi-Fi connection. For example, the determination device 100 may output an RTT value as the score indicating the communication quality. FIG. 2 illustrates that the score indicating the communication quality output by the determination device 100 is 45.

The determination device 100 determines whether or not the output information indicating the degree of deterioration of the Wi-Fi connection satisfies a predetermined condition. For example, the determination device 100 determines whether or not the output information indicating the degree of deterioration of the Wi-Fi connection exceeds a predetermined threshold. When it is determined that the output information indicating the degree of deterioration of the Wi-Fi connection satisfies the predetermined condition, the determination device 100 determines to request switching of the communication path. Further, the determination device 100 may vary the predetermined condition for switching the communication path, according to the sensor information. For example, the determination device 100 may set a standard for switching the communication path higher or lower than a standard in normal times, according to the sensor information. As a specific example, when it is determined that the user moves on foot or the like according to the sensor information, the determination device 100 may vary the predetermined threshold related to switching so as to be low in order to more easily switch the communication path. As a result, the determination device 100 can switch the communication path more efficiently and effectively. On the other hand, when it is determined that the user does not move or is stopped according to the sensor information, the determination device 100 may vary the predetermined threshold related to switching so as to be high in order for the user to continue using Wi-Fi as much as possible. As a result, the determination device 100 can provide a comfortable communication environment for the user without interrupting the communication in a connection state. For example, the determination device 100 determines to switch to another communication network. In this case, the determination device 100 determines to switch the connection of the communication network to the cellular network. On the other hand, when the output information indicating the degree of deterioration of the Wi-Fi connection does not satisfy the predetermined condition, the determination device 100 determines to continue the Wi-Fi connection. In the example illustrated in FIG. 2, it is assumed that the determination device 100 determines that the output information indicating the degree of deterioration of the Wi-Fi connection satisfies the predetermined condition.

The determination device 100 transmits information regarding a determination result to the terminal device 10. For example, the determination device 100 transmits control information according to the determination result to the terminal device 10. For example, the determination device 100 transmits control information regarding switching of the communication network according to the determination result to the terminal device 10.

The determination device 100 may transmit information for notifying the user that the communication network is unstable. For example, the determination device 100 may transmit information for notifying that stable communication cannot be performed using any bearer. As a specific example, when the user uses an elevator, the determination device 100 may estimate that a communication environment of both the cellular network and Wi-Fi becomes worse, and transmit information for notifying that stable communication cannot be performed using any bearer. More specifically, when it is determined that the user is in the elevator or the like, the determination device 100 may calculate information indicating that the environment of the communication network is bad on both the side of Wi-Fi and the side of the cellular network, and transmit information for notifying the user that the communication network is unstable.

The terminal device 10 performs processing of switching the connection of the communication network, according to the information regarding the determination result transmitted from the determination device 100. In the example illustrated in FIG. 1, the terminal device 10 of the user U1 releases the Wi-Fi connection and connects to the cellular network. Specifically, the determination device 100 instructs the terminal device 10 used by the user U1 to switch to the cellular network via a cellular communication base station identified by a cellular communication base station CI1.

Figure 2:
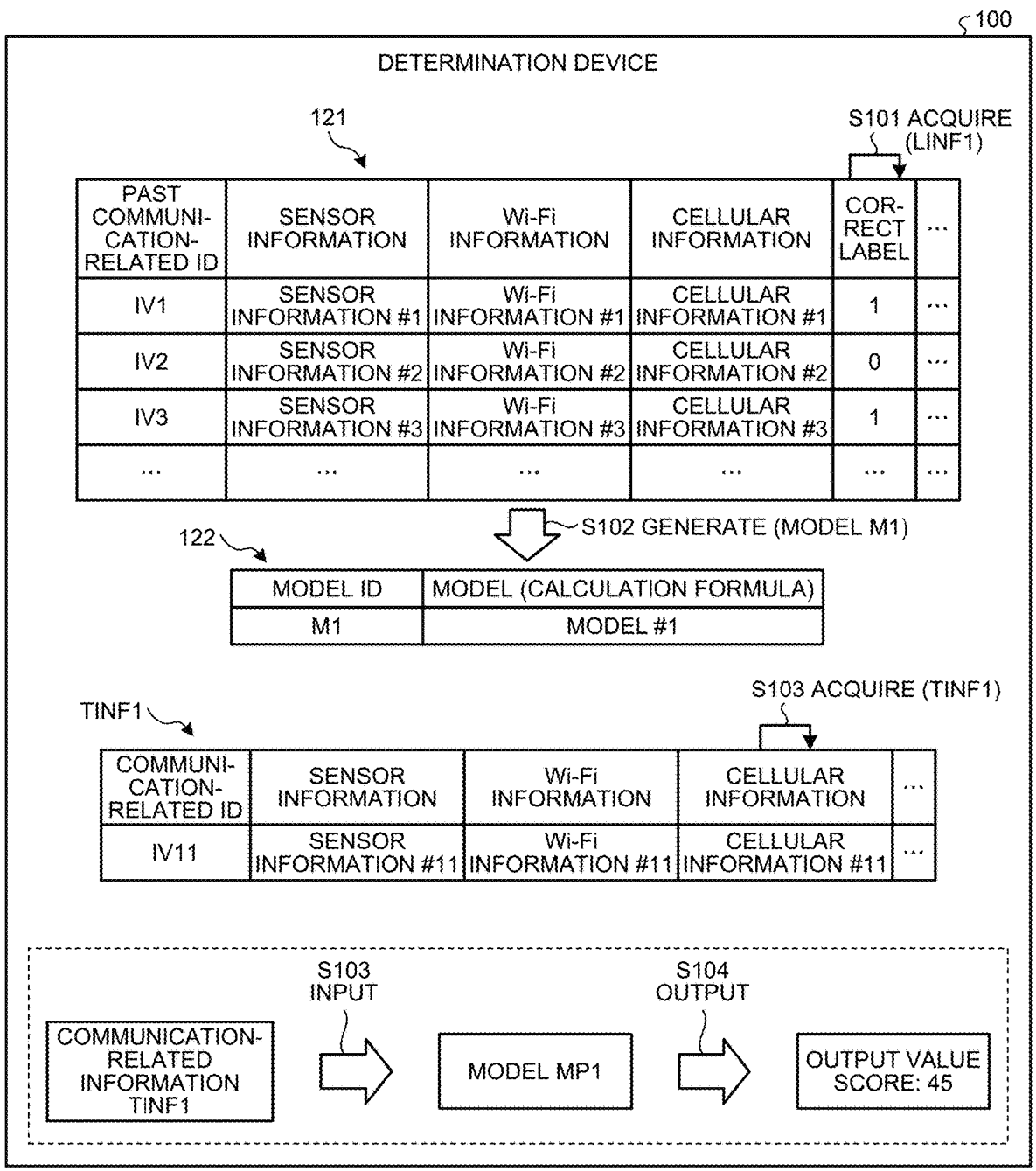
FIG. 2 is a diagram illustrating an example of information processing according to an embodiment.

Note that the various types of information processing illustrated in FIGS. 1 and 2 are not limited to the above, and may be various modes. This point will be described below.

3. Variations of Processing (3-1. Data Collection)

In the example described above, the case where the determination device 100 acquires the past communication-related information LINF1 transmitted from the information providing device 50 has been illustrated. However, the present invention is not limited to the example where the information is provided from the information providing device 50. For example, the determination device 100 may individually acquire the past communication-related information from another terminal device. For example, the determination device 100 may acquire past communication-related information uploaded to a cloud as meta information. That is, it is assumed that there is no limitation on a method for acquiring the past communication-related information by the determination device 100. As such, the determination device 100 may acquire the past communication-related information LINF1 in any manner. For example, the determination device 100 may acquire the past communication-related information LINF1 stored in a predetermined storage unit. For example, the determination device 100 may acquire the past communication-related information LINF1 stored in the past communication-related information storage unit 121. For example, the determination device 100 may acquire, as the past communication-related information LINF1, one piece of Past communication-related information selected on the basis of a predetermined condition from the past communication-related information transmitted from the information providing device 50 and the past communication-related information stored in a predetermined storage unit. For example, the determination device 100 may calculate a similarity between the communication-related information of the user and each of the acquired past communication-related information, and acquire one piece of past communication-related information in which the calculated similarity is maximum as the past communication-related information LINF1.

(3-2. Mounting of Plurality of Learning Models)

In the example described above, the case where one learning model that outputs the information indicating the degree of deterioration of the Wi-Fi connection is generated has been illustrated. However, the determination device 100 may generate a plurality of learning models. For example, the determination device 100 may generate a plurality of learning models that output a plurality of pieces of information indicating the degree of deterioration of the Wi-Fi connection and having different switching standards. As a specific example, the determination device 100 may generate a learning model for predicting disconnection of the Wi-Fi connection and a learning model for predicting the RTT on the Wi-Fi connection. In this case, the determination device 100 may select both or either one of result information using the two learning models and determine the degree of deterioration of the Wi-Fi connection. As a result, the determination device 100 can effectively infer a plurality of scenarios of Wi-Fi deterioration that are difficult to be covered by one learning model.

The determination device 100 may generate a plurality of learning models different for each state of the user. For example, the determination device 100 may previously generate a learning model suitable for walking and a learning model suitable for high-speed movement. In this case, according to the estimated state of the user, for example, the determination device 100 may perform determination using the learning model suitable for walking when the user walks, and perform the determination using the learning model suitable for high-speed movement when the user moves at a high speed on a railway or the like. Specifically, the determination device 100 may perform the determination using a learning model capable of selecting an appropriate communication network while reducing the number of times of handover, according to the estimated state of the user. As a result, the determination device 100 can predict the degradation of the communication quality due to more complicated and various conditions by performing the prediction on the basis of the plurality of switching standards, so that switching of the prediction with respect to the motion of the user can be more directly reflected. For example, in combination with the position sensor, the determination device 100 may perform the determination using a learning model that suppresses switching when it is known that the user is at home or at work, and perform the determination using a learning model that promotes switching when the user moves. As a result, the determination device 100 can suppress deterioration of UX caused by being caught by the wireless LAN while suppressing switching in a situation where the user desires to use Wi-Fi more. For example, in combination with the acceleration sensor, the determination device 100 may perform the determination using a learning model suitable for movement when the user moves. Specifically, when the user moves, the determination device 100 may perform the determination using a learning model that makes it difficult to connect to public Wi-Fi and makes it easy to switch to a cellular network. For example, in combination with the acceleration sensor, the determination device 100 may perform the determination using a learning model suitable for a stationary state when the user is in a stopped state. Specifically, when the user is in a stopped state, the determination device 100 may perform the determination using a learning model that makes it difficult to switch to the cellular network.

The determination device 100 may select one learning model from the plurality of learning models and perform the determination, or may select the plurality of learning models and perform the determination. Further, when the plurality of learning models are selected and the determination is performed, the determination device 100 may simultaneously use the plurality of learning models or may separately use the plurality of learning models.

(3-3. Switching)

In the example described above, the case where switching from Wi-Fi to another communication network is determined according to the degree of deterioration of the Wi-Fi connection has been illustrated. However, the switching target is not limited to Wi-Fi, and any communication network may be used as long as it is a communication network. For example, the determination device 100 may determine switching from a predetermined cellular network to another communication network by generating a learning model that outputs information indicating a degree of deterioration of connection of the predetermined cellular network. As a specific example, the determination device 100 may determine switching from 5G mmW to another cellular network such as 5G Sub6 or LTE. For example, the determination device 100 may determine switching from a predetermined cellular network such as 5G mmW to Wi-Fi connection.

(3-4. Correct Label)

In the example described above, an example in which the correct label is assigned at the timing at which the communication network should be switched has been illustrated. The determination device 100 may also assign a label at timing other than the timing at which the communication network should be switched. For example, the determination device 100 may assign a correct label (for example, 1) at the timing at which the communication network should be switched, and assign an incorrect label (for example, 0) at timing other than the timing at which the communication network should be switched.

In addition, the determination device 100 is not limited to the case of assigning the correct label at the moment of the timing at which the communication network should be switched, and may assign the correct label before an event of the timing at which the communication network should be switched occurs (for example, a few seconds ago). For example, when the determination device 100 determines to assign the correct label, the determination device 100 may assign the correct label before the occurrence of the event that becomes the basis (for example, the reason) where it is determined that switching is to be performed. For example, when the determination device 100 determines to assign the correct label, the determination device 100 may assign the correct label before the timing at which it is determined that switching is to be performed. Note that the timing to assign the correct label may be timing arbitrarily determined by the user who uses the terminal device 10 to be switched, or may be timing determined by the determination device 100. In this case, the determination device 100 may assign the correct label before the occurrence of the event by shifting by a predetermined time. In addition, when the correct label is assigned at the timing determined by the determination device 100, the determination device 100 may assign the correct label before the occurrence of the event by shifting by a time according to information of the event such as the scale, content, or type of the event. As a result, by assigning the correct label before the event occurs, the determination device 100 can reduce the stress of the user and improve usability.

(3-5. Switching Timing)

In the example described above, the case where the timing at which the communication network should be switched is the timing at which an RTT value exceeds the predetermined threshold or the timing at which the Wi-Fi connection is disconnected has been illustrated. However, the present invention is not limited to the above example, and any timing may be used. For example, the determination device 100 may set timing at which communication is difficult due to congestion of Wi-Fi, timing at which communication is difficult due to a time required for processing of a Wi-Fi access point or a base station, timing at which communication is difficult due to the large RTT to the Wi-Fi access point or the base station, and timing at which communication is difficult due to an interference wave in a radio wave environment as timings at which the communication network should be switched. In addition, the determination device 100 may set not only the timing at which there is a failure in the communication device or the communication path as described above but also the timing at which the UX for communication deteriorates as the timings at which the communication network should be switched. As a specific example, the determination device 100 may set timing at which a progress bar in a browser stagnates or timing at which an icon indicating that reading is in progress is displayed as the timing at which the communication network should be switched. For example, the determination device 100 may set timing at which reading fails and an error is displayed on the browser as the timing at which the communication network should be switched. For example, the determination device 100 may set timing at which an icon indicating that video is interrupted, the video is stopped, an error occurs, or the video is being read in video streaming is displayed as the timing at which the communication network should be switched. For example, the determination device 100 may set timing at which screen loading fails in an application and an error message is displayed as the timing at which the communication network should be switched.

(3-6. External Sensor)

In the example described above, the case of acquiring the sensor information detected by the sensor provided inside the terminal device 10 has been illustrated. However, the determination device 100 may acquire sensor information detected by an external sensor. In this case, the determination device 100 acquires sensor information that can be detected by an external sensor connected via an input unit and an output unit of the terminal device 10. For example, the determination device 100 may acquire sensor information that can be detected by an external sensor connected to the input unit and the output unit of the terminal device 10 via an interface such as a universal serial bus (USE) or Bluetooth (registered trademark). Note that the determination device 100 may acquire sensor information that can be detected by an external sensor connected via any interface, without being limited to the interface such as USB or Bluetooth (registered trademark). For example, the determination device 100 may acquire sensor information such as a pulse, a Step count, and an acceleration of the user from a device that can be used as an activity meter such as a smart watch attached to an arm of the user.

(3-7. Other Sensor Information)

In the example described above, an example in which the pieces of the sensor information for estimating the state of the user in real time and the sensor information for inferring the state of the user are acquired has been illustrated. The determination device 100 may acquire sensor information for estimating a situation or an attribute (type) of the user as other sensor information. For example, the determination device 100 may acquire image information captured by a camera or the like, blood pressure information, or application information for measuring the sense of immersion or the degree of stress of the user. For example, the determination device 100 may estimate an activity state of the user by acquiring the image information, the blood pressure information, and the like of the user. As a specific example, the determination device 100 may estimate that the user is training in a gym by combining the position information and the blood pressure information of the user, or may estimate that the user is driving by combining the acceleration information and the blood pressure information of the user. In addition, the determination device 100 may estimate whether the user is in a train, in a company, in a store, or the like. As a result, the determination device 100 can grasp the state of the user with higher accuracy. In addition, the determination device 100 may adjust the switching standard so that a high-speed bearer can be selected according to the state of the user. As a result, for example, even in a state in which the user feels stress, the determination device 100 can estimate the stress state of the user, adjust a switching threshold according to the estimated stress state, and appropriately switch the bearer to a higher-speed bearer.

(3-8. Download)

When information such as a file is being downloaded to the terminal device 10, the determination device 100 may determine switching to another communication network, on the basis of information regarding a downloaded target and context information of the user. For example, the determination device 100 may determine switching to another communication network, on the basis of a time required for downloading and a time required for movement based on the context information of the user. Specifically, when the time required for downloading is shorter than a movement time of the user required to exceed a communicable range with the connected communication network, the determination device 100 may determine not to switch to another communication network until downloading to the terminal device 10 is completed. More specifically, when a file is being downloaded and can be downloaded in the remaining three seconds, the determination device 100 may switch to and connect to Wi-Fi connectable only for 10 seconds (>three seconds), but may not switch to Wi-Fi connectable only for two seconds (<three seconds). In addition, the determination device 100 may determine whether or not to switch to another communication network during downloading, on the basis of information such as the importance of the file, the capacity of the file, the attribute of the file, and whether or not the file is a file downloaded by a segmented datagram.

(3-9. Terminal Device, Information Providing Device, and Determination Device)

In the example described above, the case where the terminal device 10 and the determination device 100 are separate devices has been illustrated. However, the terminal device 10 and the determination device 100 may be integrated. In this case, the mobile communication device may have all or some functions of the determination device 100 and perform all or some processing performed by the determination device 100. Further, when the mobile communication device has some functions of the determination device 100 and performs some processing performed by the determination device 100, the mobile communication device may cause an external information processing device to perform the remaining processing performed by the determination device 100.

(3-10. Learning Model)

The learning model according to the embodiment is not limited to a model based on a neural network such as deep learning, and may be any model as long as it is based on a machine learning algorithm. For example, the learning model may be a model based on a random forest.

(3-11. Combination of Communication Networks)

In the example illustrated in FIG. 1, a state in which the terminal device 10 can be connected to the wireless LAN network and the cellular network is illustrated. However, it is assumed that there is no limitation on a combination of communication networks to which the terminal device 10 can be connected. For example, the terminal device 10 may be in a state of being connectable only to a plurality of cellular networks, may be in a state of being connectable only to a wireless LAN network, or may be in a state of being connectable to a wireless LAN network and a communication network other than the cellular network. Further, in the example illustrated in FIG. 1, the case where the terminal device 10 switches connection of communication to one cellular network while being connected to the wireless LAN network is illustrated. However, it is assumed that there is no limitation on a communication network to be a target before switching of the terminal device 10 and a communication network to be a target of switching destination. For example, the terminal device 10 may switch connection of communication to the wireless LAN network while being connected to one cellular network, or may switch connection of communication to another communication network other than one cellular network while being connected to one cellular network.

4. Configuration of Terminal Device

Figure 4:
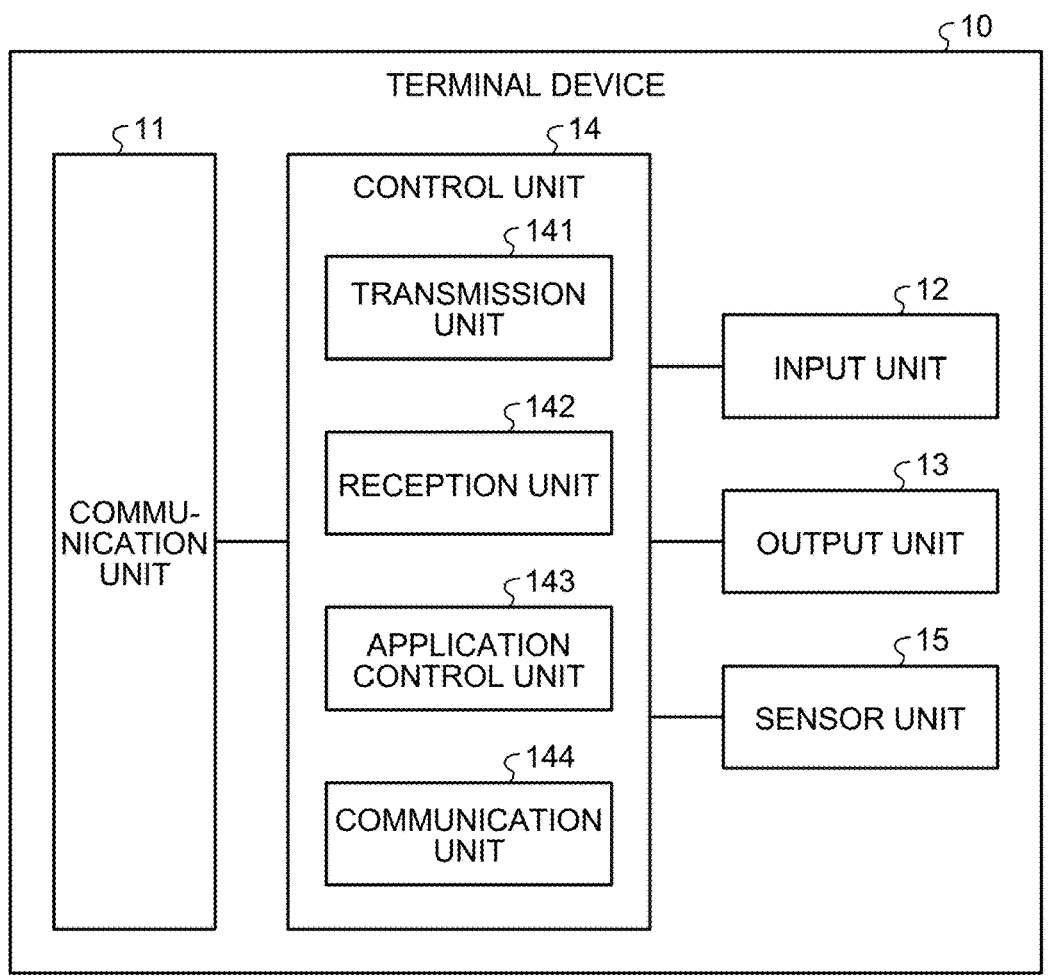
FIG. 4 is a diagram illustrating a configuration example of a terminal device according to an embodiment.

Next, a configuration of the terminal device 10 according to the embodiment will be described using FIG. 4. FIG. 4 is a diagram illustrating a configuration example of the terminal device 10 according to the embodiment. As illustrated in FIG. 4, the terminal device 10 has a communication unit 11, an input unit 12, an output unit 13, a control unit 14, and a sensor unit 15.

Note that the terminal device 10 may not have the sensor unit 15. In this case, it is assumed that the terminal device 10 is connected to an external sensor or an external information processing device having a sensor in some way. The terminal device 10 and the external sensor or the external information processing device having the sensor may be connected by any connection method as long as it is a method in which the terminal device 10 can acquire sensor information.

(Communication Unit 11)

The communication unit 11 is realized by, for example, a network interface card (NIC) or the like. In addition, the communication unit 11 is connected to a predetermined network N in a wired or wireless manner, and transmits and receives information to and from the determination device 100 and the like via the predetermined network N.

(Input Unit 12)

The input unit 12 receives various operations from the user. In the example illustrated in FIG. 1, various operations from the user U1 are received. For example, the input unit 12 may receive various operations from the user via a display surface by a touch panel function. Further, the input unit 12 may receive various operations from a button provided in the terminal device 10 or a keyboard or a mouse connected to the terminal device 10.

(Output Unit 13)

The output unit 13 is a display screen of a tablet terminal or the like realized by, for example, a liquid crystal display, an organic electro-luminescence (EL) display, or the like, and is a display device for displaying various types of information. For example, the output unit 13 outputs information for notifying the user that the communication network is unstable.

(Sensor Unit 15)

The sensor unit 15 is an internal sensor provided inside the terminal device 10. The sensor unit 15 detects sensor information on the terminal device 10. For example, the sensor unit 15 is an acceleration sensor, a magnetic sensor, a direction sensor, an atmospheric pressure sensor, a position sensor, a time sensor, a pedometer, or the like. The sensor unit 15 is not limited to the above example, and may be any sensor as long as it is a sensor that detects sensor information that can be used to estimate the state of the user in real time or infer the future state of the user. In addition, the sensor unit 15 may be a sensor that detects sensor information that can be used to measure the sense of immersion or the degree of stress of the user. Further, the sensor unit 15 may be a sensor that detects sensor information that can be used to estimate the activity state of the user.

In the example illustrated in FIG. 4, an example in which the sensor unit 15 is connected to the control unit 14 is illustrated. However, the sensor unit 15 may be connected to the input unit 12 and the output unit 13. Note that the sensor unit 15 may be connected to an input/output unit (I/O unit) that performs processing of input and output on the terminal device 10.

(Control Unit 14)

The control unit 14 is, for example, a controller, and is realized by executing various programs stored in a storage device inside the terminal device 10 using a random access memory (RAM) as a work area by a central processing unit (CPU), a micro processing unit (MPU), or the like. For example, the various programs include a program of an application installed in the terminal device 10. For example, the various programs include a program of an application that displays information for notifying the user that the communication network is unstable. Further, the control unit 14 is realized by, for example, an integrated circuit such as an application specific integrated circuit (ASIC) or a field programmable gate array (FPGA).

As illustrated in FIG. 4, the control unit 14 has a transmission unit 141, a reception unit 142, an application control unit 143, and a communication unit 144, and realizes or executes a function of information processing described below.

(Transmission Unit 141)

The transmission unit 141 provides various types of information to an external information processing device. The transmission unit 141 transmits various types of information to the external information processing device. The transmission unit 141 transmits various types of information to another information processing device such as the determination device 100. For example, the transmission unit 141 transmits communication-related information.

(Reception Unit 142)

The reception unit 142 receives various types of information. The reception unit 142 receives various types of information from an external information processing device. The reception unit 142 receives various types of information from another information processing device such as the determination device 100. For example, the reception unit 142 receives information regarding a determination result by the determination device 100. For example, the reception unit 142 receives control information according to the determination result by the determination device 100. For example, the reception unit 142 receives information for notifying the user that the communication network is unstable.

(Application Control Unit 143)

The application control unit 143 controls various types of information regarding an application started on the terminal device 10. The application control unit 143 transmits various types of information regarding the started application to the communication unit 144.

(Communication Unit 144)

The communication unit 144 controls communication of various types of information. The communication unit 144 controls communication to the communication network. The communication unit 144 controls switching of communication. The communication unit 144 controls switching of communication according to a determination result by another information processing device such as the determination device 100. The communication unit 144 controls switching of communication according to various types of information regarding the application acquired from the application control unit 143.

5. Configuration of Information Providing Device

Figure 5:
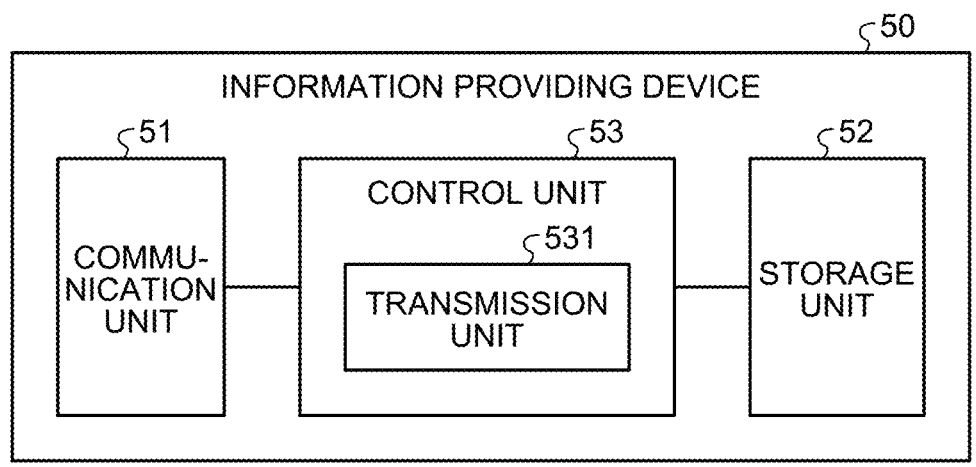
FIG. 5 is a diagram illustrating a configuration example of an information providing device according to an embodiment.

Next, a configuration of the information providing device 50 according to the embodiment will be described using FIG. 5. FIG. 5 is a diagram illustrating a configuration example of the information providing device 50 according to the embodiment. As illustrated in FIG. 5, the information providing device 50 has a communication unit 51, a storage unit 52, and a control unit 53. Note that the information providing device 50 may have an input unit (for example, a keyboard, a mouse, or the like) that receives various operations from an administrator of the information providing device 50, and a display unit (for example, a liquid crystal display or the like) that displays various types of information.

(Communication Unit 51)

The communication unit 51 is realized by, for example, an NIC or the like. In addition, the communication unit 51 is connected to the network N in a wired or wireless manner, and transmits and receives information to and from the determination device 100 and the like via the network N.

(Storage Unit 52)

The storage unit 52 is realized by, for example, a semiconductor memory element such as a RAM or a flash memory, or a storage device such as a hard disk or an optical disk. The storage unit 52 stores past communication-related information.

(Control Unit 53)

The control unit 53 is a controller, and is realized by executing various programs stored in a storage device inside the information providing device 50 using a RAM as a work area by, for example, a CPU, an MPU, or the like. Further, the control unit 53 is a controller, and is realized by, for example, an integrated circuit such as an ASIC or an FPGA.

As illustrated in FIG. 5, the control unit 53 has a transmission unit 531, and realizes or executes a function of information processing described below. Note that the internal configuration of the control unit 53 is not limited to the configuration illustrated in FIG. 5, and may be another configuration as long as it is a configuration where information processing to be described later is performed.

(Transmission Unit 531)

The transmission unit 531 provides various types of information to an external information processing device. The transmission unit 531 transmits various types of information to an external information processing device. The transmission unit 531 notifies an external information processing device of various types of information. The transmission unit 531 transmits various types of information to another information processing device such as the determination device 100. For example, the transmission unit 531 transmits past communication-related information. For example, the transmission unit 531 transmits the past communication-related information LINF1.

6. Configuration of Determination Device

Figure 6:
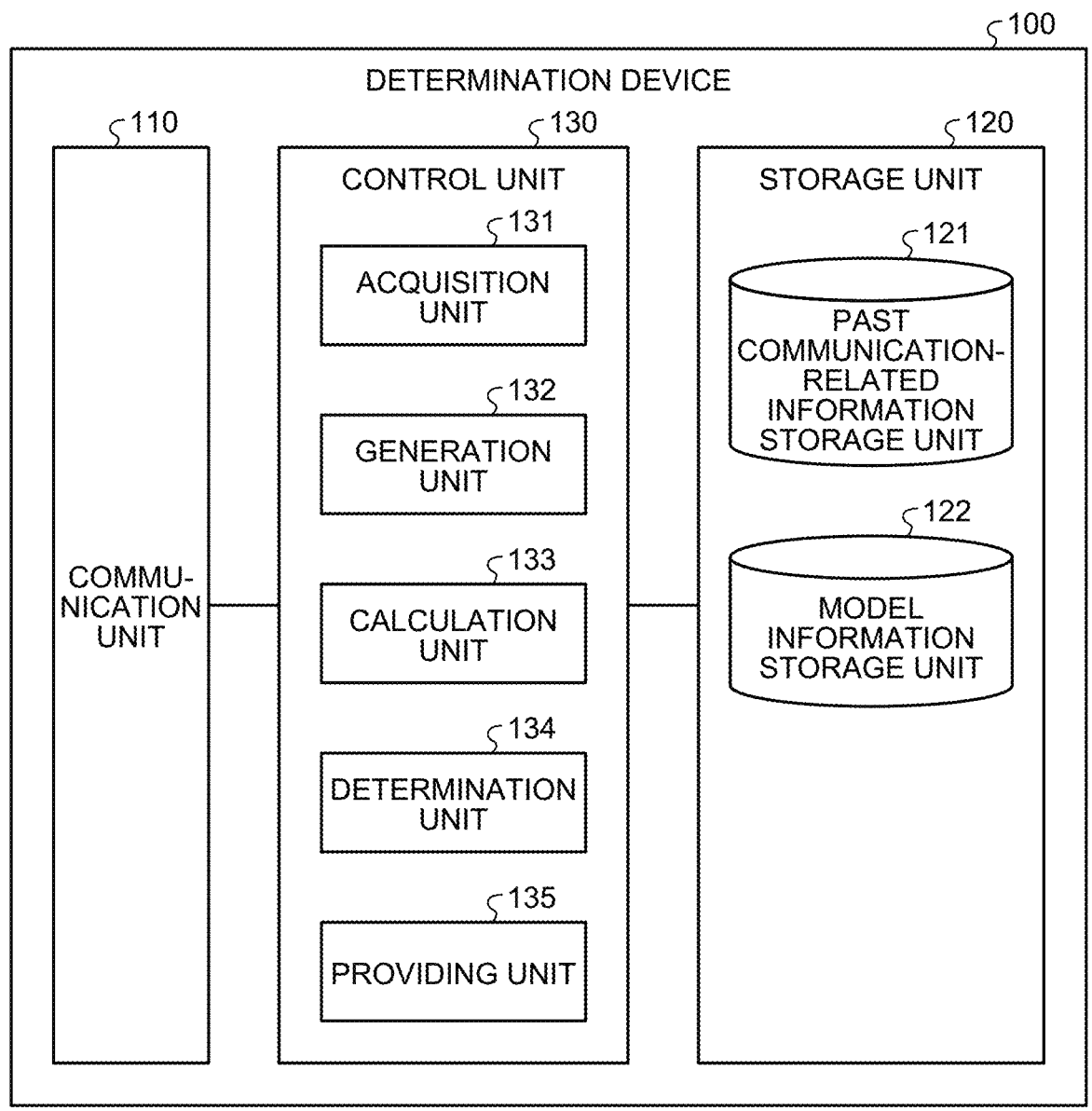
FIG. 6 is a diagram illustrating a configuration example of a determination device according to an embodiment.

Next, a configuration of the determination device 100 according to the embodiment will be described using FIG. 6. FIG. 6 is a diagram illustrating a configuration example of the determination device 100 according to the embodiment. As illustrated in FIG. 6, the determination device 100 has a communication unit 110, a storage unit 120, and a control unit 130. Note that the determination device 100 may include an input unit (for example, a keyboard, a mouse, or the like) that receives various operations from an administrator of the determination device 100, and a display unit (for example, a liquid crystal display or the like) that displays various types of information.

(Communication Unit 110)

The communication unit 110 is realized by, for example, an NIC or the like. In addition, the communication unit 110 is connected to the network N in a wired or wireless manner, and transmits and receives information to and from the terminal device 10 and the like via the network N. Further, the communication unit 110 may perform communication by selectively connecting to a plurality of communication networks.

(Storage Unit 120)

The storage unit 120 is realized by, for example, a semiconductor memory element such as a RAM or a flash memory, or a storage device such as a hard disk or an optical disk. As illustrated in FIG. 6, the storage unit 120 has the past communication-related information storage unit 121 and the model information storage unit 122.

The past communication-related information storage unit 121 stores past communication-related information. Here, FIG. 7 illustrates an example of the past communication-related information storage unit 121 according to the embodiment. As illustrated in FIG. 7, the Past communication-related information storage unit 121 has items such as "data ID", "sensor information", "cellular information", "Wi-Fi information", and "correct label".

The "data ID" indicates identification information for identifying the past communication-related information. The "sensor information" indicates sensor information included in the past communication-related information. As illustrated in FIG. 7, the "sensor information" may have items of sensor information for each sensor, such as "acceleration", "magnetism", "direction", "atmospheric pressure", and "position". Further, the "sensor information" is not limited to the above example, and may have an item corresponding to any sensor as long as it is an item of sensor information that can be acquired on the terminal device 10. In the example illustrated in FIG. 7, an example in which conceptual information such as "acceleration #1", "magnetism #1", "direction #1", "atmospheric pressure #1", and "position #1" is stored in "sensor information" has been illustrated. However, in actuality, data such as values or scores output on the basis of information detected for each sensor is stored. The "cellular information" indicates information related to the cellular network included in the past communication-related information. As illustrated in FIG. 7, the "cellular information" may have items for each cellular network, such as "5G mmW" and "LTE". Further, the "cellular information" is not limited to the above example, and may have an item corresponding to any cellular network as long as it is an item for each cellular network that can perform communication on the terminal device 10. In the example illustrated in FIG. 7, an example in which conceptual information such as "5G mmW #1" and "LTE #1" is stored in "cellular information" has been illustrated. However, in actuality, data such as values or scores output on the basis of the communication quality (RTT, RSSI, or the like) of each cellular network is stored. The "Wi-Fi information" indicates information related to Wi-Fi included in the past communication-related information. As illustrated in FIG. 7, the "Wi-Fi information" may have items such as "RTT" and "disconnection probability". Further, the "Wi-Fi information" is not limited to the above example, and may have any item as long as it is an item corresponding to the information indicating the communication quality of Wi-Fi. In the example illustrated in FIG. 7, an example in which conceptual information such as "RTT #1" and "disconnection probability #1" is stored in "Wi-Fi information" has been illustrated. However, in actuality, data such as values or scores output on the basis of the communication quality of Wi-Fi is stored. The "correct label" indicates whether or not timing is timing at which the communication network should be switched. "1" included in the "correct label" indicates that the timing is the timing at which the communication network should be switched. "0" included in the "correct label" indicates that the timing is not the timing at which the communication network should be switched.

The model information storage unit 122 stores information regarding the model. For example, the model information storage unit 122 stores information regarding a model that outputs information indicating the degree of deterioration of the communication network. FIG. 8 illustrates an example of the model information storage unit 122. As illustrated in FIG. 8, the model information storage unit 122 has items such as "model ID" and "model (calculation formula)".

The "model ID" indicates identification information for identifying the model. The "model (calculation formula)" indicates a calculation formula of the model. In the example illustrated in FIG. 8, an example in which conceptual information such as "model #1" and "model #2" is stored in "model (calculation formula)" has been illustrated. However, in actuality, data of a function is stored. For example, data of a function that outputs information indicating the degree of deterioration of the communication network is stored in the "model (calculation formula)".

(Control Unit 130)

The control unit 130 is a controller, and is realized by executing various programs stored in a storage device inside the determination device 100 using a RAM as a work area by, for example, a CPU, an MPU, or the like. Further, the control unit 130 is a controller, and is realized by, for example, an integrated circuit such as an ASIC or an FPGA.

As illustrated in FIG. 6, the control unit 130 has an acquisition unit 131, a generation unit 132, a calculation unit 133, a determination unit 134, and a providing unit 135, and realizes or executes a function of information processing described below. Note that the internal configuration of the control unit 130 is not limited to the configuration illustrated in FIG. 6, and may be another configuration as long as it is a configuration where information processing to be described later is performed.

(Acquisition Unit 131)

The acquisition unit 131 acquires various types of information. The acquisition unit 131 acquires various types of information from an external information processing device. The acquisition unit 131 acquires various types of information from another information processing device such as the terminal device 10.

The acquisition unit 131 acquires various types of information from the storage unit 120. The acquisition unit 131 acquires various types of information from the past communication-related information storage unit 121 or the model information storage unit 122.

The acquisition unit 131 stores the acquired various types of information in the storage unit 120. The acquisition unit 131 stores various types of information in the past communication-related information storage unit 121 or the model information storage unit 122.

The acquisition unit 131 acquires various types of information generated, calculated, and determined by other functional configurations.

The acquisition unit 131 acquires the past communication-related information. The acquisition unit 131 acquires the communication-related information. The acquisition unit 131 acquires sensor information detected by the mobile communication device used by the user. The acquisition unit 131 acquires a sensor parameter regarding the sensor information. The acquisition unit 131 acquires communication information indicating a state of the communication quality to each communication network. The acquisition unit 131 acquires a communication parameter regarding each communication network in the communication information.

(Generation Unit 132)

The generation unit 132 generates various types of information. The generation unit 132 generates various types of information from the storage unit 120. The generation unit 132 generates various types of information from the past communication-related information storage unit 121 or the model information storage unit 122.

The generation unit 132 stores the generated various types of information in the storage unit 120. The generation unit 132 stores various types of information in the past communication-related information storage unit 121 or the model information storage unit 122.

The generation unit 132 generates various types of information acquired, calculated, and determined by other functional configurations. The generation unit 132 generates various types of information on the basis of the various types of information acquired, calculated, and determined by other functional configurations.

The generation unit 132 generates a model. The generation unit 132 learns the model. The generation unit 132 generates a model for causing a computer to function so as to output a score indicating the degree of deterioration of the communication network. The generation unit 132 generates a model that outputs a score indicating the degree of deterioration of the communication network, according to the input of the communication-related information. The generation unit 132 generates a model using the past communication-related information determined as the timing at which the communication network should be switched among the past communication-related information as correct information. The generation unit 132 generates a model using the past communication-related information determined as the timing at which the communication network should not be switched among the past communication-related information as incorrect information. The generation unit 132 generates a model using the past communication-related information to which the correct label has been assigned as the correct information at the corresponding timing. The generation unit 132 generates a model using the past communication-related information to which the incorrect label has been assigned as the incorrect information at the corresponding timing. Note that the generation unit 132 may generate the model on the basis of the past communication-related information to which the correct label has been assigned by excluding the past communication-related information to which the incorrect label has been assigned, or may generate the model on the basis of both the past communication-related information to which the correct label has been assigned and the past communication-related information to which the incorrect label has been assigned by learning the past communication-related information to which the incorrect label has been assigned as the incorrect information.

(Calculation Unit 133)

The calculation unit 133 calculates various types of information. The calculation unit 133 calculates various types of information from the storage unit 120. The calculation unit 133 calculates various types of information from the past communication-related information storage unit 121 or the model information storage unit 122.

The calculation unit 133 stores the calculated various types of information in the storage unit 120. The calculation unit 133 stores various types of information in the past communication-related information storage unit 121 or the model information storage unit 122.

The calculation unit 133 calculates various types of information acquired, generated, and determined by other functional configurations. The calculation unit 133 calculates various types of information on the basis of the various types of information acquired, generated, and determined by other functional configurations.

The calculation unit 133 calculates a score indicating the degree of deterioration of the communication network. The calculation unit 133 calculates a score indicating the degree of deterioration of the communication network, according to the input of the communication-related information. The calculation unit 133 calculates a score indicating the degree of deterioration of the communication network, on the basis of the model generated by the generation unit 132.

(Determination Unit 134)

The determination unit 134 determines various types of information. The determination unit 134 determines various types of information from the storage unit 120. The determination unit 134 determines various types of information from the past communication-related information storage unit 121 or the model information storage unit 122.

The determination unit 134 stores the determined various types of information in the storage unit 120. The determination unit 134 stores various types of information in the past communication-related information storage unit 121 or the model information storage unit 122.

The determination unit 134 determines various types of information acquired, generated, and calculated by other functional configurations. The determination unit 134 determines various types of information on the basis of the various types of information acquired, generated, and calculated by other functional configurations.

The determination unit 134 determines whether to switch to another communication network among the plurality of communication networks. The determination unit 134 determines whether to switch to another communication network among the plurality of communication networks on the basis of the sensor information and the communication information acquired by the acquisition unit 131.

The determination unit 134 determines whether to switch to another network on the basis of the sensor information for estimating the state of the user in real time among the sensor information acquired by the acquisition unit 131. For example, the determination unit 134 determines whether to switch to another network on the basis of sensor information indicating the position or the movement speed of the user.

The determination unit 134 determines whether to switch to another network on the basis of the sensor information for inferring the state of the user among the sensor information acquired by the acquisition unit 131. The determination unit 134 determines whether to switch to another network on the basis of the context information of the user. For example, the determination unit 134 determines whether to switch to another network on the basis of sensor information for inferring an action of the user. For example, the determination unit 134 determines whether to switch to another network on the basis of sensor information for inferring the action of the user such as moving on foot, moving by a train, moving by a vehicle, going up and down stairs, or going up and down by an elevator.

The determination unit 134 determines whether to switch the wireless LAN network to the cellular network. For example, the determination unit 134 determines whether to switch the wireless LAN network to the cellular network, on the basis of communication information of communication performed via the wireless LAN network. In addition, the determination unit 134 determines whether to switch the cellular network to the wireless LAN network. For example, the determination unit 134 determines whether to switch the cellular network to the wireless LAN network, on the basis of communication information of communication performed via the cellular network. In addition, the determination unit 134 determines whether to switch one cellular network to another cellular network. For example, the determination unit 134 determines whether to switch one cellular network to another cellular network, on the basis of communication information of communication performed via one cellular network.

The determination unit 134 determines whether to switch to another communication network on the basis of the communication parameter acquired by the acquisition unit 131. The determination unit 134 determines whether to switch to another communication network on the basis of the RSSI, the LinkSpeed, the packet communication state, or the like as the communication parameter.

The determination unit 134 determines whether to switch to another communication network on the basis of the sensor parameter acquired by the acquisition unit 131.

The determination unit 134 determines whether to switch to another communication network using a learning model that outputs a score indicating a scale of whether or not to execute switching of the communication network with at least one of the communication parameter and the sensor parameter as input information. The determination unit 134 determines whether to switch to another communication network using a learning model that outputs a score of each communication network with at least one of the communication parameter and the sensor parameter as input information.

(Providing Unit 135)

The providing unit 135 provides various types of information to an external information processing device. The providing unit 135 transmits various types of information to the external information processing device. The providing unit 135 notifies the external information processing device of various types of information. The providing unit 135 distributes various types of information to the external information processing device. The providing unit 135 provides various types of information to another information processing device such as the terminal device 10.

The providing unit 135 provides various types of information acquired, generated, and determined by other functional configurations.

The providing unit 135 provides information regarding a determination result determined by the determination unit 134. The providing unit 135 provides control information according to the determination result. For example, the providing unit 135 provides control information regarding switching of the communication network according to the determination result. The providing unit 135 provides information for notifying the user that the communication network is unstable.

7. Details of Determination Device

Figure 9:
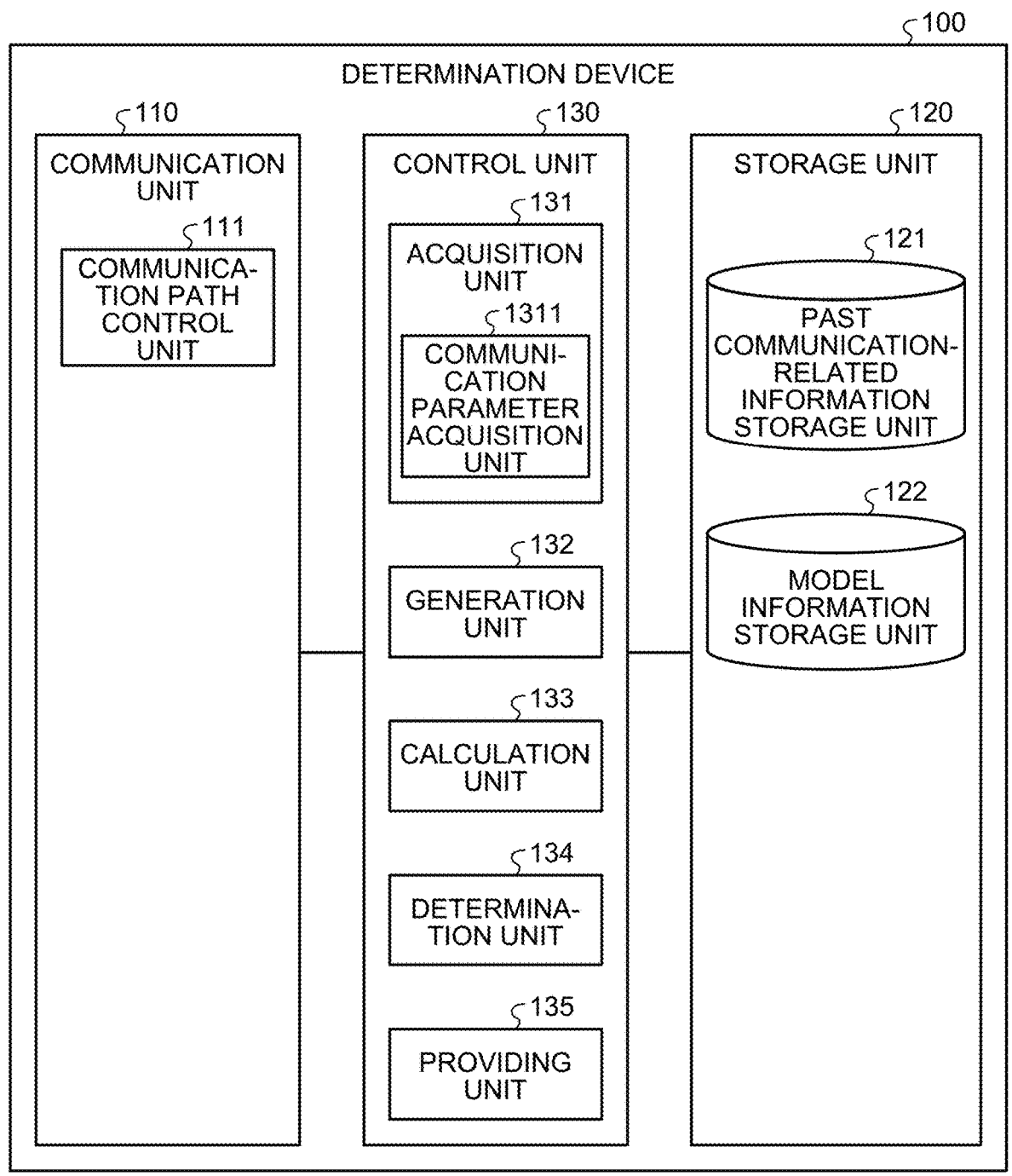
FIG. 9 is a diagram illustrating a configuration example of a determination device according to an embodiment.

As illustrated in FIG. 9, the communication unit 110 of the determination device 100 according to the embodiment has a communication path control unit 111 and realizes or executes a function of information processing described below. Note that the internal configuration of the communication unit 110 is not limited to the configuration illustrated in FIG. 9, and may be another configuration as long as it is a configuration where information processing to be described later is performed.

(Communication Path Control Unit 111)

The communication path control unit 111 controls various types of information regarding switching of the communication network. The communication path control unit 111 controls various types of information on the basis of various types of information regarding switching of the communication network. For example, the communication path control unit 111 executes switching of the communication network on the basis of a communication bearer switching request. For example, the communication path control unit 111 switches connection of the communication network from a cellular network (for example, 5GmmW and Sub6) to Wi-Fi. For example, the communication path control unit 111 switches the connection of the communication network from Wi-Fi to the cellular network. As such, the communication path control unit 111 selectively connects to a plurality of communication networks and performs communication. In the example illustrated in FIG. 9, the case where the communication path control unit 111 is a part of the communication unit 110 has been illustrated. However, the communication path control unit 111 may have a configuration different from the configuration of the communication unit 110. Specifically, the communication path control unit 111 may be one of other components included in the determination device 100 different from the communication unit 110. For example, the communication path control unit 111 may be one component included in the control unit 130.

Further, as illustrated in FIG. 9, the acquisition unit 131 of the determination device 100 according to the embodiment has a communication parameter acquisition unit 1311 and a sensor information acquisition unit 1312, and realizes or executes a function of information processing described below. Note that the internal configuration of the acquisition unit 131 is not limited to the configuration illustrated in FIG. 9, and may be another configuration as long as it is a configuration where information processing to be described later is performed.

(Communication Parameter Acquisition Unit 1311)

The communication parameter acquisition unit 1311 acquires communication information regarding each communication network. For example, the communication parameter acquisition unit 1311 acquires a communication parameter regarding each communication network.

(Sensor Information Acquisition Unit 1312)

The sensor information acquisition unit 1312 acquires sensor information. For example, the sensor information acquisition unit 1312 acquires a sensor parameter regarding the sensor.

In the example illustrated in FIG. 9, the case where the communication parameter acquisition unit 1311 is a part of the acquisition unit 131 has been illustrated. However, the communication parameter acquisition unit 1311 may have a configuration different from that of the acquisition unit 131. For example, the communication parameter acquisition unit 1311 may be one of other components included in the control unit 130 different from the acquisition unit 131. Further, in the example illustrated in FIG. 9, the case where the sensor information acquisition unit 1312 is a part of the acquisition unit 131 has been illustrated. However, the sensor information acquisition unit 1312 may have a configuration different from that of the acquisition unit 131. For example, the sensor information acquisition unit 1312 may be one of other components included in the control unit 130 different from the acquisition unit 131.

8. Flow of Information Processing

Figure 10:
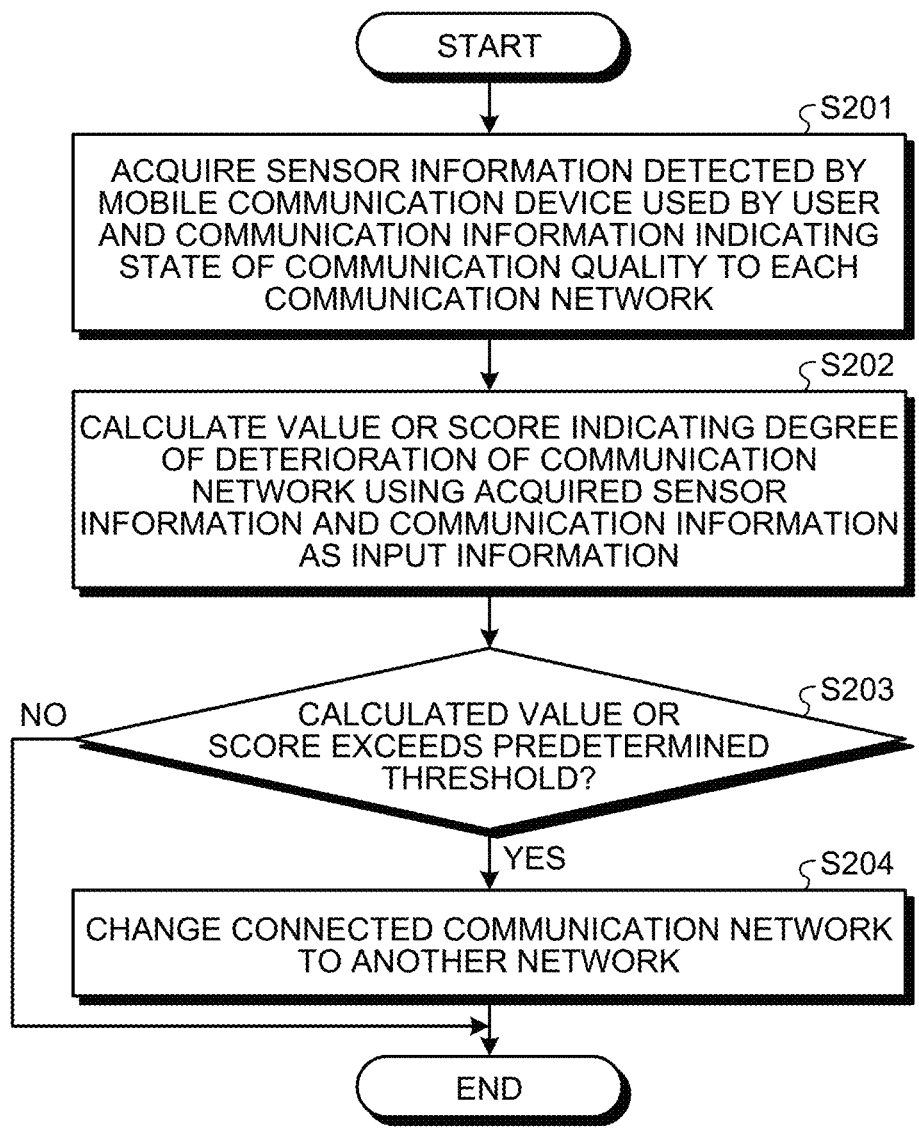
FIG. 10 is a flowchart illustrating an example of information processing according to an embodiment.

Next, a procedure of information processing by the information processing system 1 according to the embodiment will be described using FIG. 10. FIG. 10 is a flowchart illustrating a procedure of information processing by the information processing system 1 according to the embodiment.

As illustrated in FIG. 10, the determination device 100 acquires sensor information detected by the mobile communication device used by the user and communication information indicating a state of communication quality to each communication network (Step S201). The determination device 100 calculates a value or a score indicating the degree of deterioration of the communication network using the acquired sensor information and communication information as input information (Step S202). The determination device 100 determines whether or not the calculated value or score exceeds a predetermined threshold (Step S203). When it is determined that the calculated value or score does not exceed the predetermined threshold (Step S203; NO), the determination device 100 ends the information processing. On the other hand, when it is determined that the calculated value or score exceeds the predetermined threshold (Step S203; YES), the determination device 100 changes the connected communication network to another network (Step S204).

9. Modification

The information processing system 1 according to the above-described embodiment may be implemented in various different modes other than the above-described embodiment. Therefore, other embodiments of the information processing system 1 will be described below. Note that description of points similar to those of the embodiment illustrated in FIGS. 1 and 2 will be omitted as appropriate.

[9-1. First Modification (Another Configuration Example of Terminal Device)]

Figure 11:
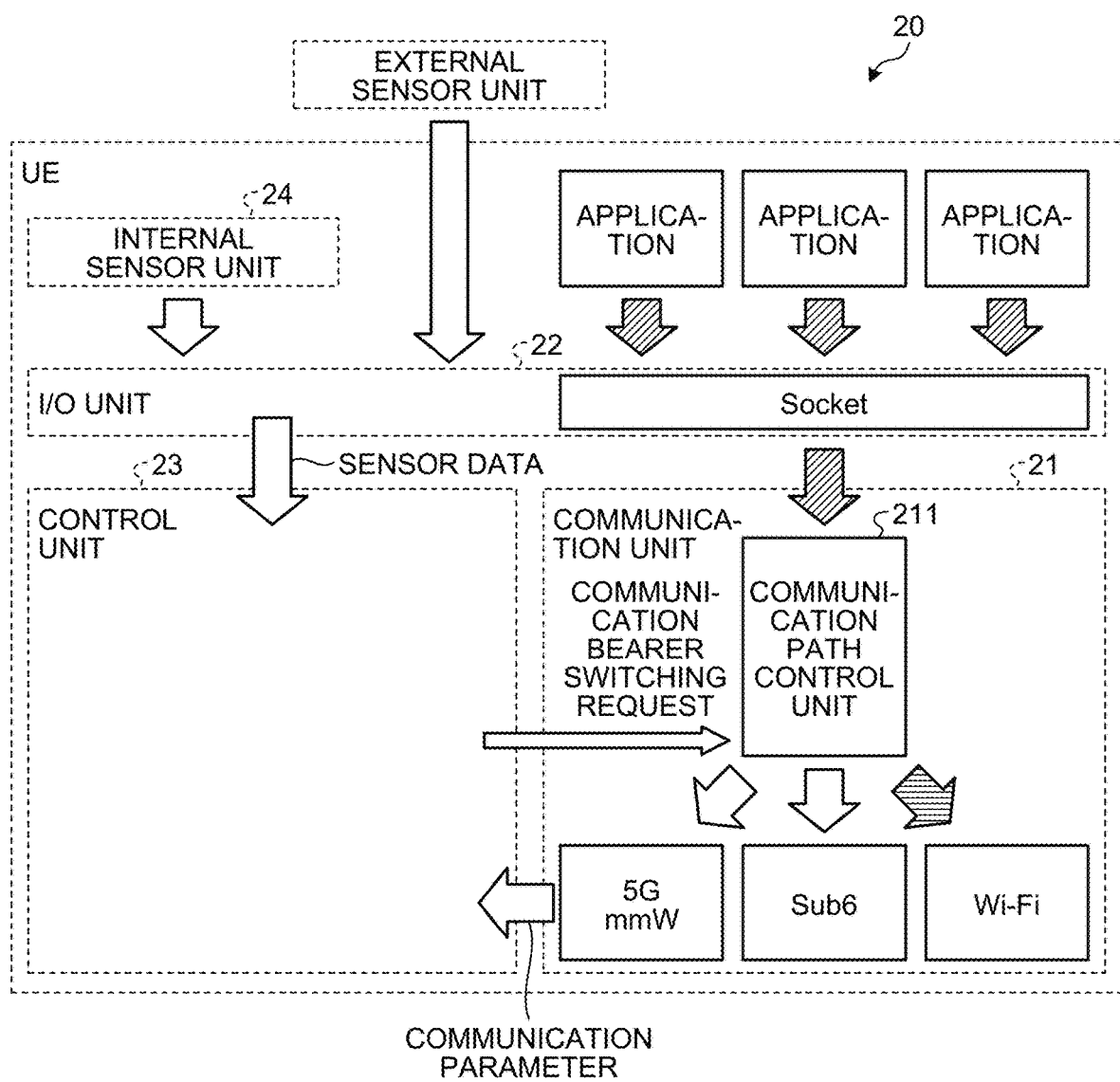
FIG. 11 is a diagram illustrating a configuration example of a terminal device according to an embodiment.
Figure 12:
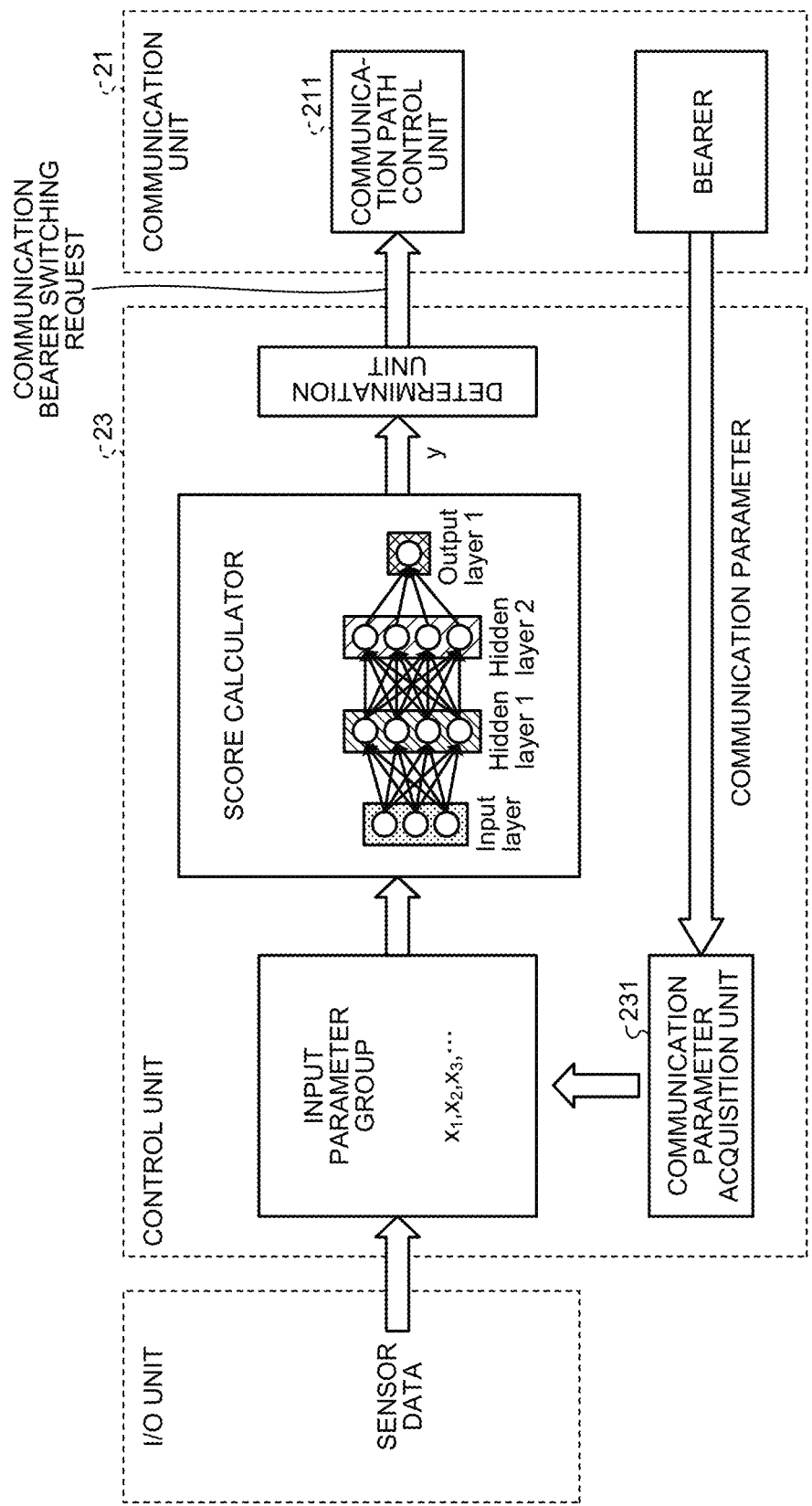
FIG. 12 is a diagram illustrating a configuration example of a terminal device according to an embodiment.

In the example described above, the case where the terminal device 10 and the determination device 100 are separate devices has been illustrated. However, the terminal device 10 and the determination device 100 may be integrated. A configuration in a case where the terminal device 10 and the determination device 100 according to the embodiment are integrated will be described using FIG. 11. Hereinafter, in order to simplify the description, the configuration in the case where the terminal device 10 and the determination device 100 according to the embodiment are integrated will be described as another configuration example of the terminal device 10. Note that description of processing similar to that of the terminal device 10 and the determination device 100 according to the embodiment will be omitted. FIG. 11 is a diagram illustrating a configuration of a terminal device 20 which is another configuration example of the terminal device 10 according to the embodiment. As illustrated in FIG. 11, the terminal device 20 has a communication unit 21, an input/output (I/O) unit 22, a control unit 23, and an internal sensor unit 24. In addition, as illustrated in FIG. 11, the communication unit 21 of the terminal device 20 according to the embodiment may have a communication control unit 211. The communication control unit 211 switches a bearer according to a communication bearer switching request. FIG. 12 is a diagram illustrating the details of the control unit 23. As illustrated in FIG. 12, the control unit 23 of the terminal device 20 according to the embodiment may have a communication parameter unit 231. The communication parameter unit 231 acquires a communication parameter from each bearer. Note that the internal configuration of the control unit 23 may not be limited to the configuration illustrated in FIG. 12.

[9-2. Second Modification (Millimeter Wave Communication)]

Hereinafter, a case where millimeter wave communication in 5G is used as a communication network will be described. In general, the millimeter wave communication in 5G performs communication using beamforming, but it is necessary to adjust a radio wave reception direction as the terminal device 10 moves. In the example illustrated in FIG. 1, the case where the degree of deterioration of the Wi-Fi connection is predicted and the communication network is switched has been illustrated. The determination device 100 may predict the deterioration in the quality of the millimeter wave communication and select appropriate beamforming. Specifically, the determination device 100 acquires a communication state of the millimeter wave communication during communication and a movement state of the terminal device 10, predicts the deterioration in the quality of the millimeter wave communication, and selects appropriate beamforming. In this case, since the communication network conforms to the millimeter wave communication in the fifth generation, the cellular network is a communication network conforming to the millimeter wave communication in the fifth generation.

The determination device 100 may acquire the movement state of the terminal device 10 through, for example, a positioning system such as a magnetic sensor, an atmospheric pressure sensor, an acceleration sensor, or GPS/GNSS. Note that the determination device 100 may acquire the movement state of the terminal device 10 not only through the above example but also through any sensor.

The determination device 100 may determine the communication state of the millimeter wave communication during communication through, for example, parameters such as signal strength, a coding scheme, the number of MIMO, the number of communication allocation times, a reception/transmission packet counter value, the number of transmission successes, the number of reception successes, the number of retransmissions, the number of frame failures, the number of interface errors, the throughput, cell information, New Radio (NR) cell information, NR Absolute Radio Frequency, Physical Cell id, MCC, MNC, a beam ID, reception strength, reception quality, and S/N of a synchronization signal reference signal, reception strength, reception quality, and S/N of a CSI signal, ASU, and CSI-RSRP. Note that the determination device 100 may determine the communication state of the millimeter wave communication during communication not only through the above example but also through any parameter. For example, the determination device 100 may calculate a disconnection probability of near future communication in order to determine the communication state of the millimeter wave communication. In this case, when the calculated disconnection probability exceeds a predetermined threshold, the determination device 100 changes a direction of an antenna array or performs handover to a different beam.

When it is recognized that the user walks or stays at a fixed point, the determination device 100 may determine that the millimeter wave communication is used, and when it is recognized that the user moves at a high speed on a vehicle or the like, the determination device 100 may determine that a cellular network such as Sub6 or LTE is used. In this case, the determination device 100 performs the determination by measuring the communication quality of each bearer and performing the disconnection prediction.

Figure 13:
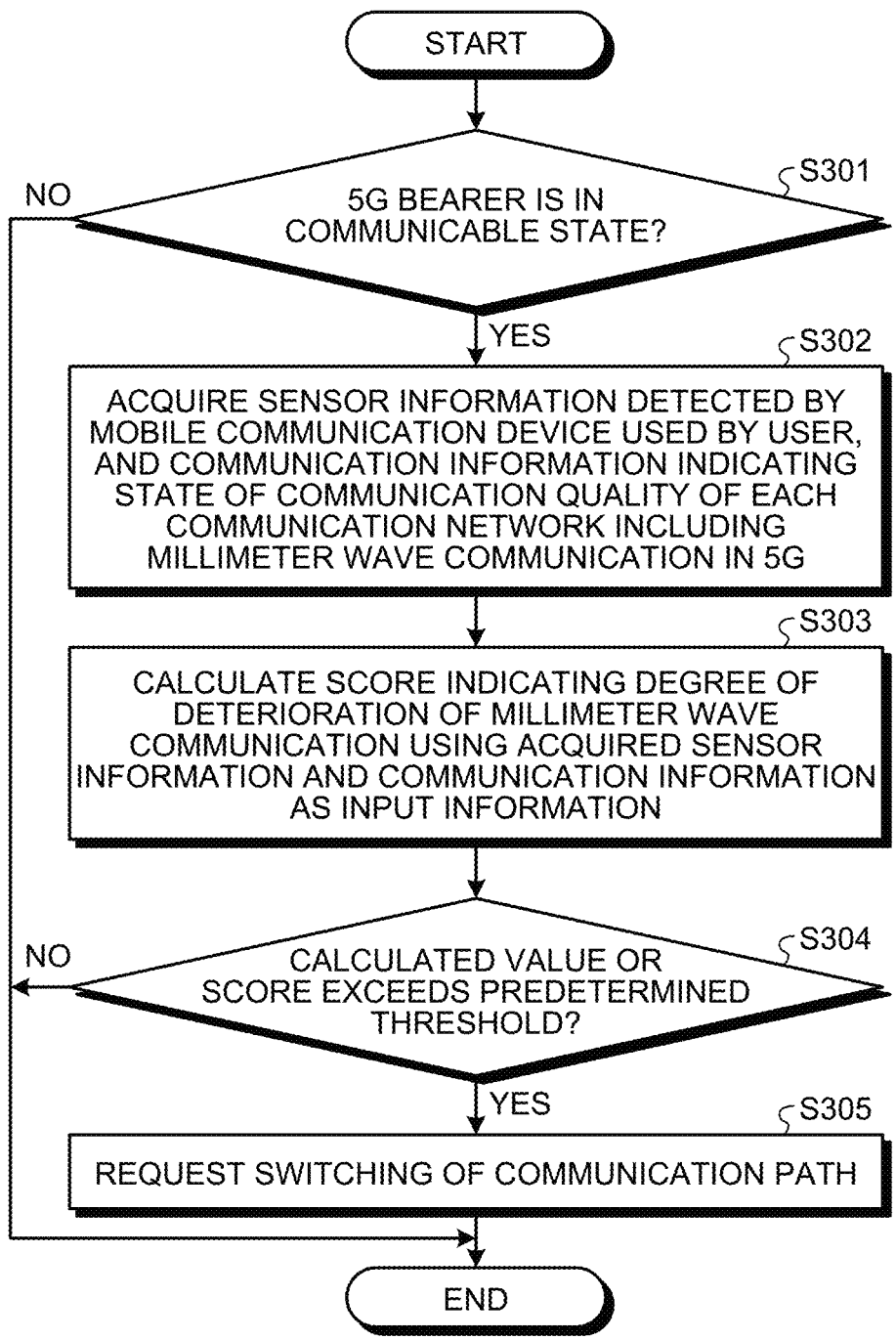
FIG. 13 is a flowchart illustrating an example of information processing according to an embodiment.

Hereinafter, a procedure of information processing by an information processing system 1 according to a second modification will be described using FIG. 13. FIG. 13 is a flowchart illustrating the procedure of the information processing by the information processing system 1 according to the second modification.

The determination device 100 determines whether a 5G bearer is in a communicable state (Step S301). When the 5G bearer is not in a communicable state (Step S301; NO), the determination device 100 may end the information processing, or may shift to, for example, an LTE-only switching prediction engine. When the 5G bearer is in a communicable state (Step S301; YES), the determination device 100 acquires the sensor information detected by the mobile communication device used by the user and the communication information indicating the state of the communication quality of the millimeter wave communication in 5G (Step S302). The determination device 100 calculates a score indicating the degree of deterioration of the millimeter wave communication using the acquired sensor information and communication information as input information (Step S303). The determination device 100 determines whether or not the calculated score exceeds a predetermined threshold (Step S304). For example, the determination device 100 determines whether or not the calculated score is higher than that of the currently selected bearer. When it is determined that the calculated score does not exceed the predetermined threshold (Step S304; NO), the determination device 100 ends the information processing. On the other hand, when it is determined that the calculated score exceeds the predetermined threshold (Step S304; YES), the determination device 100 requests switching of the communication path (Step S305). Specifically, the determination device 100 changes the connected communication network to another network.

[9-3. Third Modification (Switching of Bearer According to Application)]

Hereinafter, a case where a bearer is switched according to an application to be used will be described. In general, there is a case where cellular is better in terms of delay than a case where Wi-Fi is used, such as a case where mobile edge computing (MEC) installed in a carrier network can be used. For example, in a case of an online game requiring low delay, a bearer with a small delay amount may be selected. In this case, cellular may be used even in an environment where Wi-Fi can be used. In addition, in a case where the delay amount is optimized and comfortable communication is performed, it is necessary to optimally perform handover.

Figure 14:
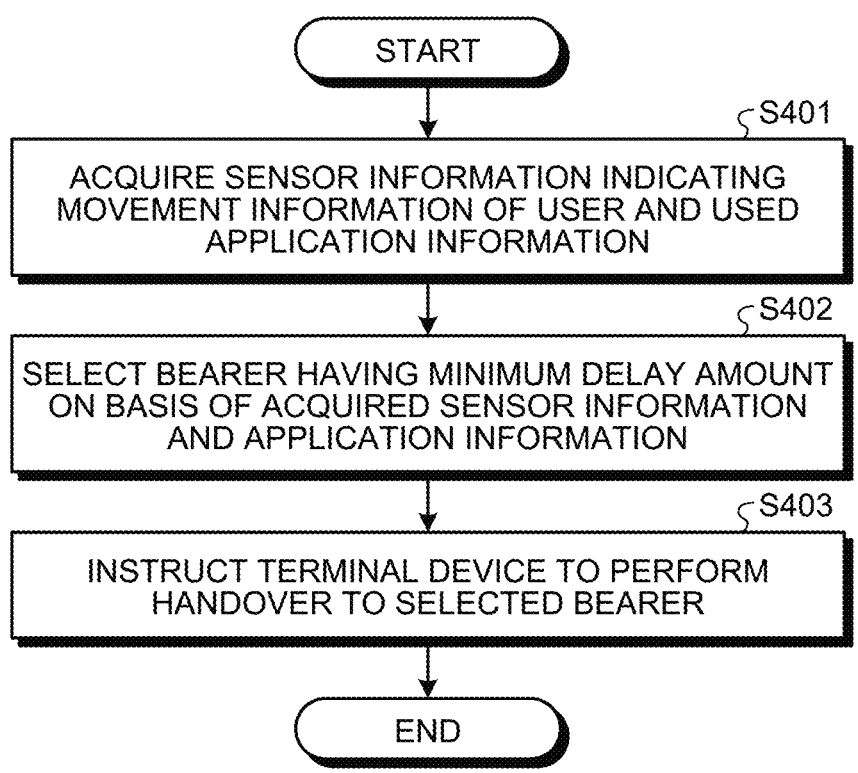
FIG. 14 is a flowchart illustrating an example of information processing according to an embodiment.

The determination device 100 combines sensor information (for example, a movement direction, a movement speed, and acceleration) by a sensor provided inside the terminal device 10 and performs optimum handover or beam selection for a user who requests low delay. Hereinafter, a procedure of information processing by an information processing system 1 according to a third modification will be described using FIG. 14. FIG. 14 is a flowchart illustrating the procedure of the information processing by the information processing system 1 according to the third modification.

The determination device 100 acquires sensor information indicating movement information of the user and application information used in the terminal device 10 (Step S401). For example, the determination device 100 acquires the movement speed of the terminal device 10, and a used application and a required delay amount or a throughput thereof as a result of the activity recognition. The determination device 100 selects a bearer with a minimum delay amount on the basis of the acquired sensor information and application information (Step S402). The determination device 100 instructs the terminal device 10 to perform handover to the selected bearer (Step S403).

Figure 15:
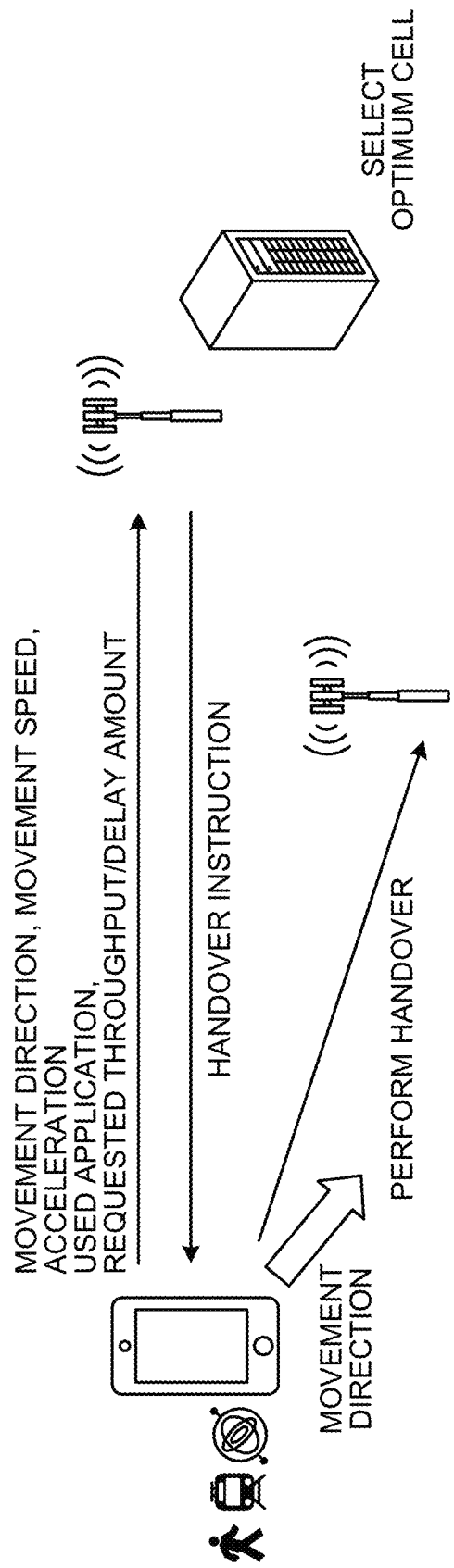
FIG. 15 is a diagram illustrating an example of information processing according to an embodiment.

As illustrated in FIG. 15, the determination device 100 may transmit, to the base station or the cellular network, the movement speed of the terminal device 10, and a used application and a required delay amount or a throughput thereof as a result of the activity recognition. Further, the determination device 100 may request the base station or the cellular network to select an optimum bearer on the basis of the transmission information. Further, the determination device 100 may instruct the terminal device 10 to perform handover to the selected bearer, on the basis of information transmitted from the base station or the cellular network.

[9-4. Fourth Modification (Score Calculation for Each Bearer)]

In the above embodiment, a case where a plurality of learning models are simultaneously used for one bearer has been illustrated. The determination device 100 may generate and use a learning model for each bearer. Specifically, the determination device 100 may generate a learning model for each bearer, calculate a score for each bearer, and predict near future communication quality for each bearer. Hereinafter, description will be given using FIGS. 16 and 17.

Figure 16:
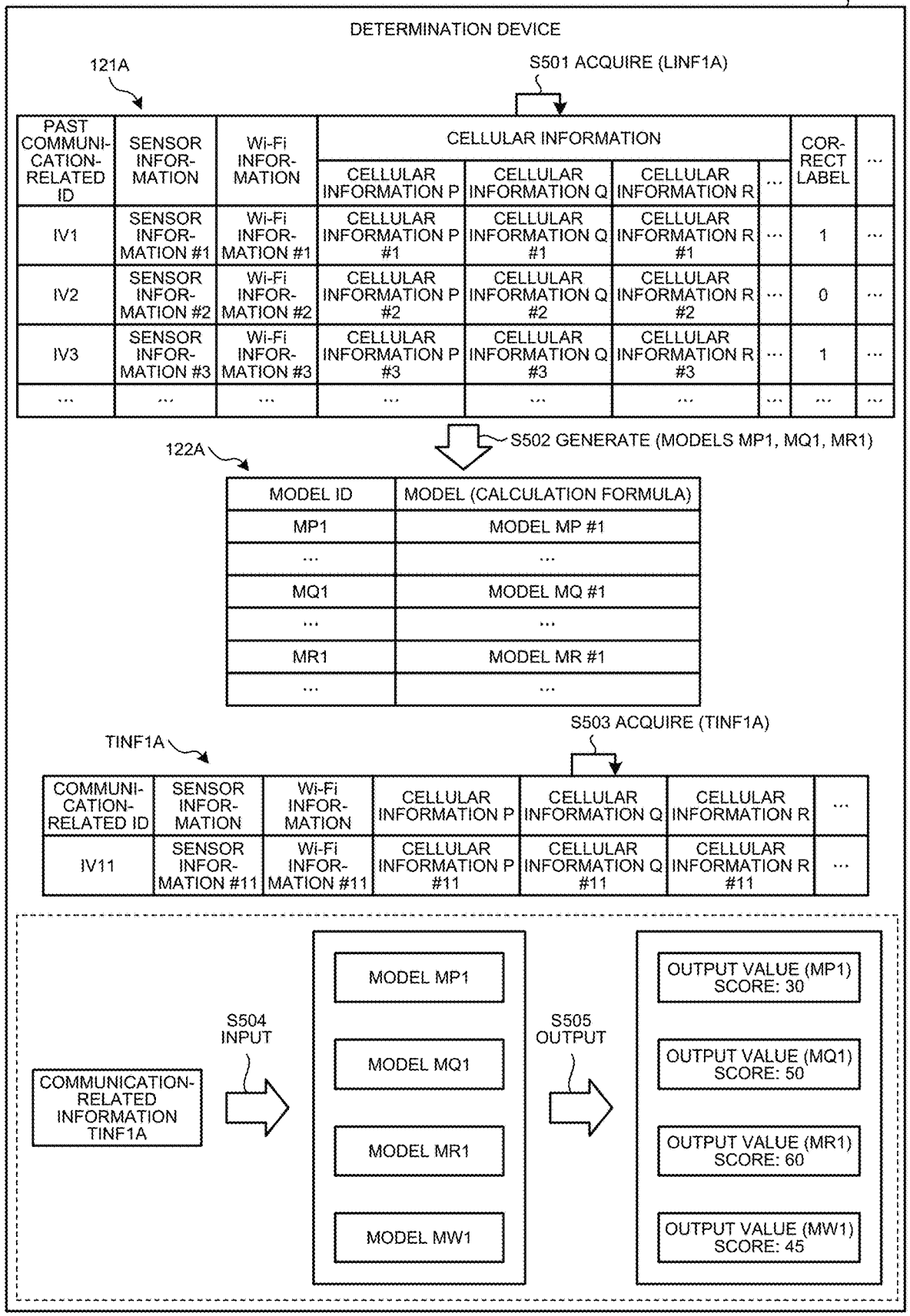
FIG. 16 is a diagram illustrating an example of information processing according to an embodiment.

An example of determination processing according to a fourth modification will be described using FIG. 16. The determination device 100 acquires past communication-related information LINF1A (Step S501). The determination device 100 acquires a plurality of different pieces of cellular information for each bearer. For example, the determination device 100 acquires cellular information F, cellular information Q, and cellular information R. The determination device 100 generates a learning model for each bearer by using different cellular information for each bearer (Step S502). For example, the determination device 100 generates a model MP1 on the basis of the sensor information and the cellular information P. For example, the determination device 100 generates a model MQ1 on the basis of the sensor information and the cellular information Q. For example, the determination device 100 generates a model MR1 on the basis of the sensor information and the cellular information R. In addition, the determination device 100 stores all or a part of the generated models. For example, the determination device 100 stores all or a part of the generated models in a predetermined storage unit. For example, the determination device 100 stores all or a part of the generated models in a model information storage unit 122A. In addition, the determination device 100 may store the generated model for each bearer. For example, the determination device 100 may store the generated model in a storage unit for each bearer.

Similarly to the example illustrated in FIG. 2, the determination device 100 acquires communication-related information TINF1A (Step S503). Note that the communication-related information TINF1A includes the cellular information P, the cellular information Q, and the cellular information R as information related to the cellular network that can be acquired by the terminal device 10.

The determination device 100 inputs each combination of the sensor information and the cellular information in the acquired communication-related information TINF1A to the corresponding model. For example, the determination device 100 inputs the cellular information P and the sensor information to the model MP1. In this case, the determination device 100 outputs information indicating the degree of deterioration of the cellular network corresponding to the cellular information P. In FIG. 16, the determination device 100 outputs that the score indicating the communication quality is 30 as the information indicating the degree of deterioration of the cellular network corresponding to the cellular information P. For example, the determination device 100 inputs the cellular information Q and the sensor information to the model MQ1. In this case, the determination device 100 outputs information indicating the degree of deterioration of the cellular network corresponding to the cellular information Q. In FIG. 16, the determination device 100 outputs that the score indicating the communication quality is 50 as the information indicating the degree of deterioration of the cellular network corresponding to the cellular information Q. For example, the determination device 100 inputs the cellular information R and the sensor information to the model MR1. In this case, the determination device 100 outputs information indicating the degree of deterioration of the cellular network corresponding to the cellular information R. In FIG. 16, the determination device 100 outputs that the score indicating the communication quality is 60 as the information indicating the degree of deterioration of the cellular network corresponding to the cellular information R.

The determination device 100 inputs a combination of the sensor information and the Wi-Fi information in the acquired communication-related information TINF1A to the corresponding model. For example, the determination device 100 inputs the Wi-Fi information and the sensor information to a model MW1. In this case, the determination device 100 outputs information indicating a degree of deterioration of the Wi-Fi connection. In FIG. 16, the determination device 100 outputs that the score indicating the communication quality is 45 as the information indicating the degree of deterioration of the Wi-Fi connection.

The determination device 100 selects an optimum communication network on the basis of the output score indicating the communication quality. For example, the determination device 100 selects a communication network having the maximum output score. In the above example, the determination device 100 compares the score 30 of the cellular information P, the score 50 of the cellular information Q, and the score 60 of the cellular information R, and selects the cellular network corresponding to the cellular information R having the maximum score of 60. Note that the determination device 100 may select the optimum cellular network on the basis of the output score, compare the optimum cellular network with Wi-Fi, and select the optimum communication network. In the above example, the determination device 100 may select the cellular network corresponding to the cellular information R having the maximum score, compare the score 60 of the selected cellular network with the score 45 of Wi-Fi, and select the cellular network corresponding to the cellular information R having the larger score as the optimum communication network.

Note that the determination device 100 may use an RTT value as the score indicating the communication quality. In this case, the determination device 100 selects a communication network having a smaller RTT value as an optimum communication network. Using the above example, the determination device 100 selects the cellular network corresponding to the cellular information P having the minimum RTT value among the cellular information P, the cellular information Q, and the cellular information R. In addition, the determination device 100 compares the RTT value 30 of the selected cellular network with the RTT value 45 of Wi-Fi, and selects a cellular network corresponding to the cellular information P having the smaller RTT value as an optimum communication network.

Figure 17:
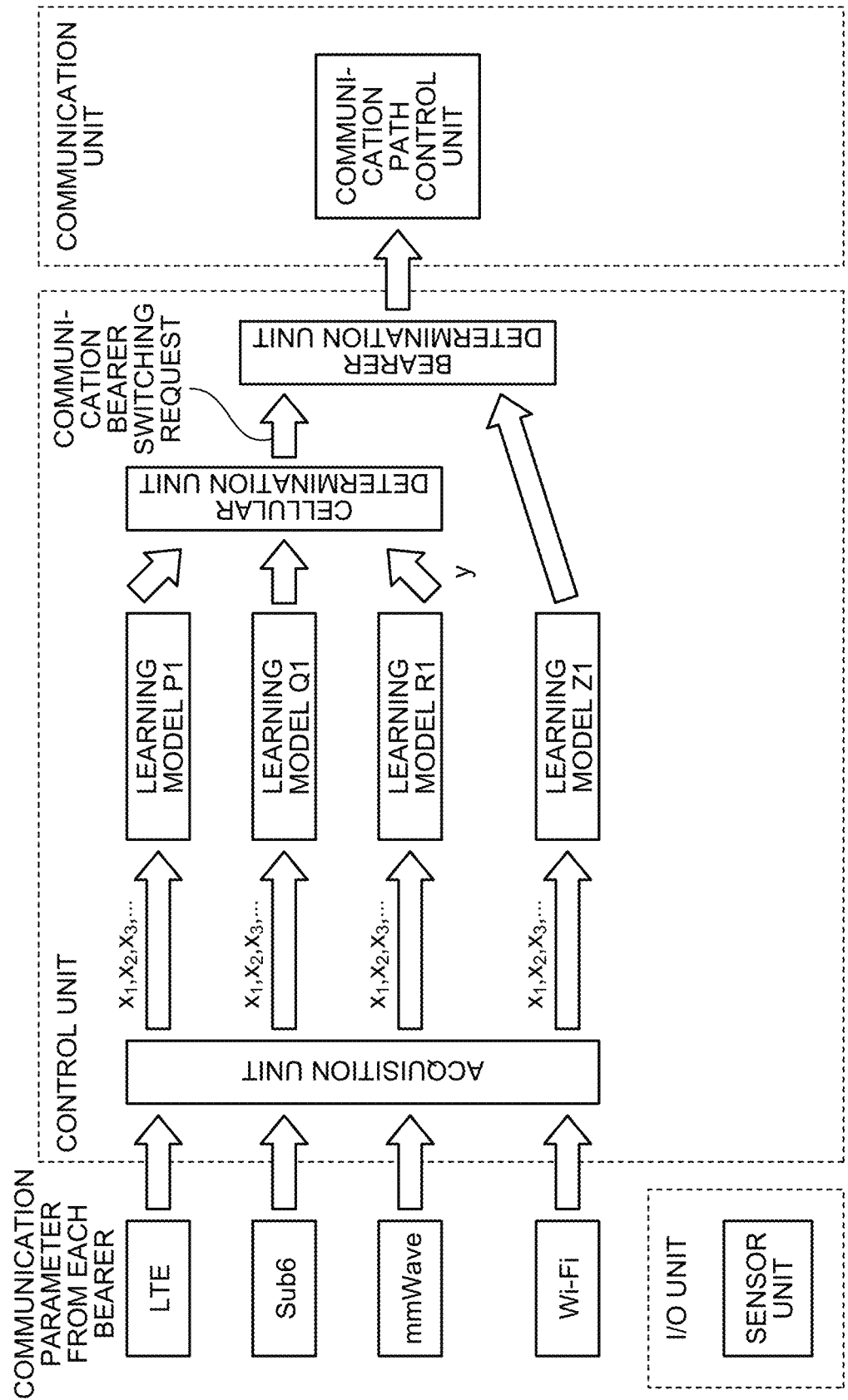
FIG. 17 is a diagram illustrating a configuration example of a determination device according to an embodiment.

FIG. 17 illustrates a case where LTE, Sub6, and mmWave are used. In FIG. 17, in a state in which bearers of mmWave, Sub6, and LIE are selectable, the determination device 100 calculates a score of near future communication quality for each bearer in combination with the sensor information. Specifically, the determination device 100 inputs the cellular information of LIE to the learning model corresponding to LIE to calculate the score of LIE, and predicts the degree of deterioration of the communication state of LIE. For example, the determination device 100 inputs the cellular information of Sub6 to the learning model corresponding to Sub6, calculates the score of Sub6, and predicts the degree of deterioration of the communication state of Sub6. For example, the determination device 100 inputs the cellular information of mmWave to the learning model corresponding to mmWave to calculate the score of mmWave, and predicts the degree of deterioration of the communication state of mmWave. In FIG. 17, the determination device 100 calculates a score of near future communication quality for each bearer in combination with the sensor information in a state where the bearers of mmWave, Sub6, and LIE can communicate with the terminal device 10.

In general, in the bearer of mmWave, since the throughput is high, but the coverage is small, there is the possibility of frequent disconnection. In this case, the determination device 100 simultaneously predicts the near future communication quality of Sub6 and LIE and determines the bearer of the transition destination from mmWave. Further, in a case where Wi-Fi is available at the same time, the determination device 100 predicts near future communication quality of Wi-Fi, thereby determining the destination to which the bearer should be switched even in a case where the connection to Wi-Fi is established. As a result, the determination device 100 can realize seamless transition of the network bearer and can always continue to select an optimum network.

Figure 18:
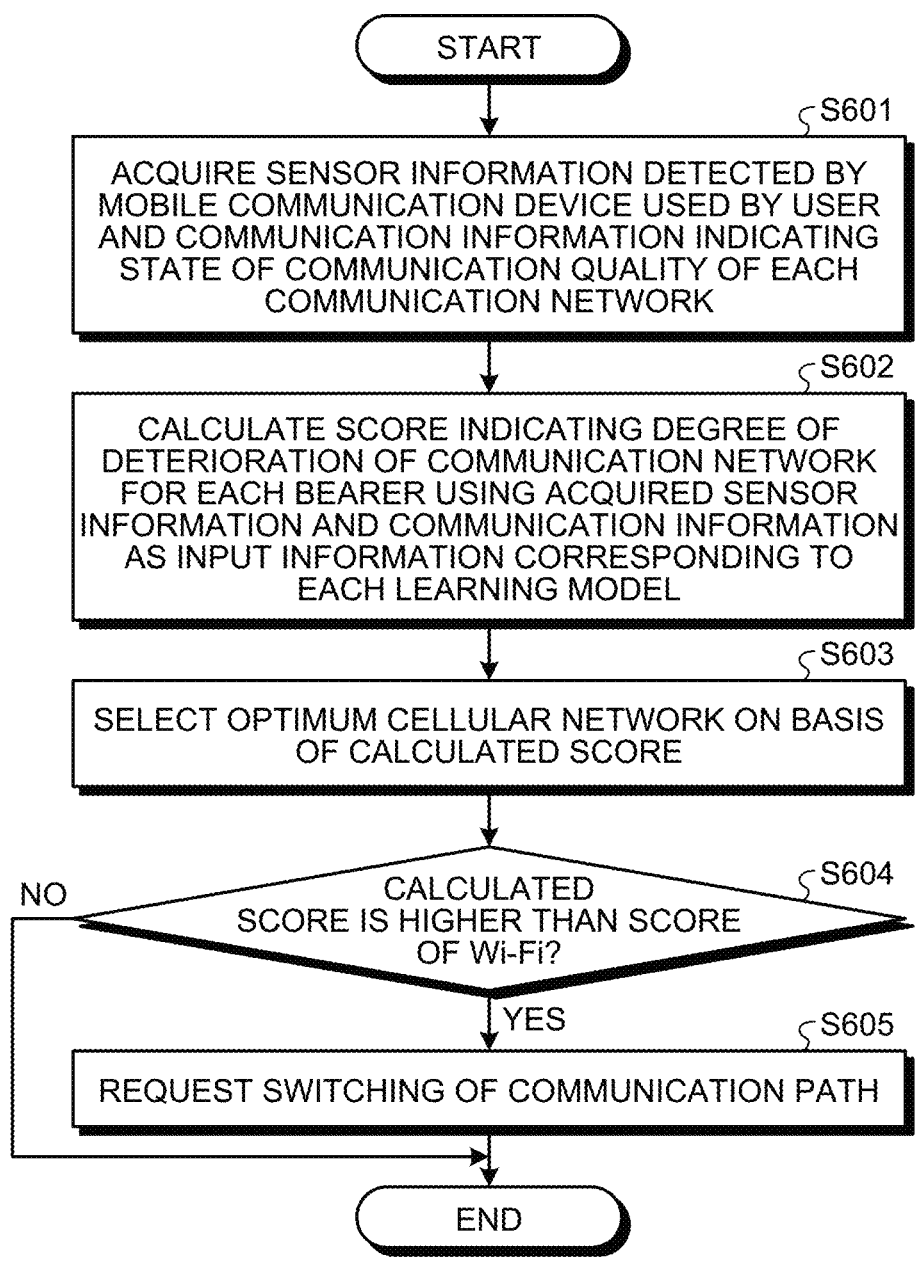
FIG. 18 is a flowchart illustrating an example of information processing according to an embodiment.

Hereinafter, a procedure of information processing by an information processing system 1 according to the fourth modification will be described using FIG. 18. FIG. 18 is a flowchart illustrating the procedure of the information processing by the information processing system 1 according to the fourth modification. The determination device 100 acquires sensor information detected by the mobile communication device used by the user and communication information indicating a state of communication quality of each communication network (Step S601). The determination device 100 calculates a score indicating the degree of deterioration of the communication network for each bearer using the acquired sensor information and communication information as input information corresponding to each learning model (Step S602). The determination device 100 selects an optimum cellular network on the basis of the calculated score (Step S603). The determination device 100 determines whether the calculated score is higher than the score of Wi-Fi (Step S604). When the calculated score is lower than the score of Wi-Fi, the determination device 100 ends the information processing. When the calculated score is higher than the score of Wi-Fi, the determination device 100 requests switching of the communication path (Step S605). For example, the determination device 100 instructs the terminal device to change to a cellular network.

Note that, in FIG. 18, the procedure of the processing in which the determination device 100 selects an optimum network from the cellular networks, compares the score of the network with the score of Wi-Fi, and switches the network has been described. Here, a procedure of processing in which the determination device 100 simultaneously compares scores of all communication networks including the cellular network and Wi-Fi, and switches to a communication network having the maximum score will be described. In this case, the determination device 100 performs processing similar to Steps 8601 and S602 illustrated in FIG. 18. In Steps S603 and S604, the determination device 100 compares all the calculated scores including the cellular network and Wi-Fi and selects a communication network having the maximum score. In Step S605, the determination device 100 requests switching to the communication network having the maximum score. For example, the determination device 100 calculates each score indicating the degree of deterioration of each communication network of LIE, Sub6, mmWave, and Wi-Fi, and instructs the terminal device to switch to the communication network having the maximum score.

[9-5. Fifth Modification (Download Trained Data According to Location)]

In the embodiment described above, the case of using the learning model generated or installed in the terminal device 10 has been illustrated. However, a learning model provided from the outside may be used. For example, the determination device 100 may use a learning model provided by updating or the like from the outside. Hereinafter, a case where the learning model is downloaded from the outside on the basis of position information acquired from the sensor information and switching is performed on the basis of the downloaded learning model will be described.

As a result, the determination device 100 can realize switching of bearers optimized for areas that cannot be learned from general data. For example, the determination device 100 can effectively utilize a wireless LAN spot on a platform or in-vehicle Wi-Fi by downloading a learning model optimized for a route in which the user gets on the train. In general, in a case where the upstream of in-vehicle Wi-Fi is WiMAX or the like, when a vehicle enters a tunnel, there is a possibility that access to a WAN disappears and network communication disappears. In this case or the like, the determination device 100 can predict that the vehicle enters the tunnel by externally adapting a learning model optimal for the route, and can switch to the cellular before the upstream network is disconnected. In addition, the determination device 100 can improve the overall communication quality by adapting a learning model tuned to be offloaded to Wi-Fi as much as possible in an area where a large number of people are expected to gather such as a stadium or an event and the terminal density in a cell increases.

Figure 19:
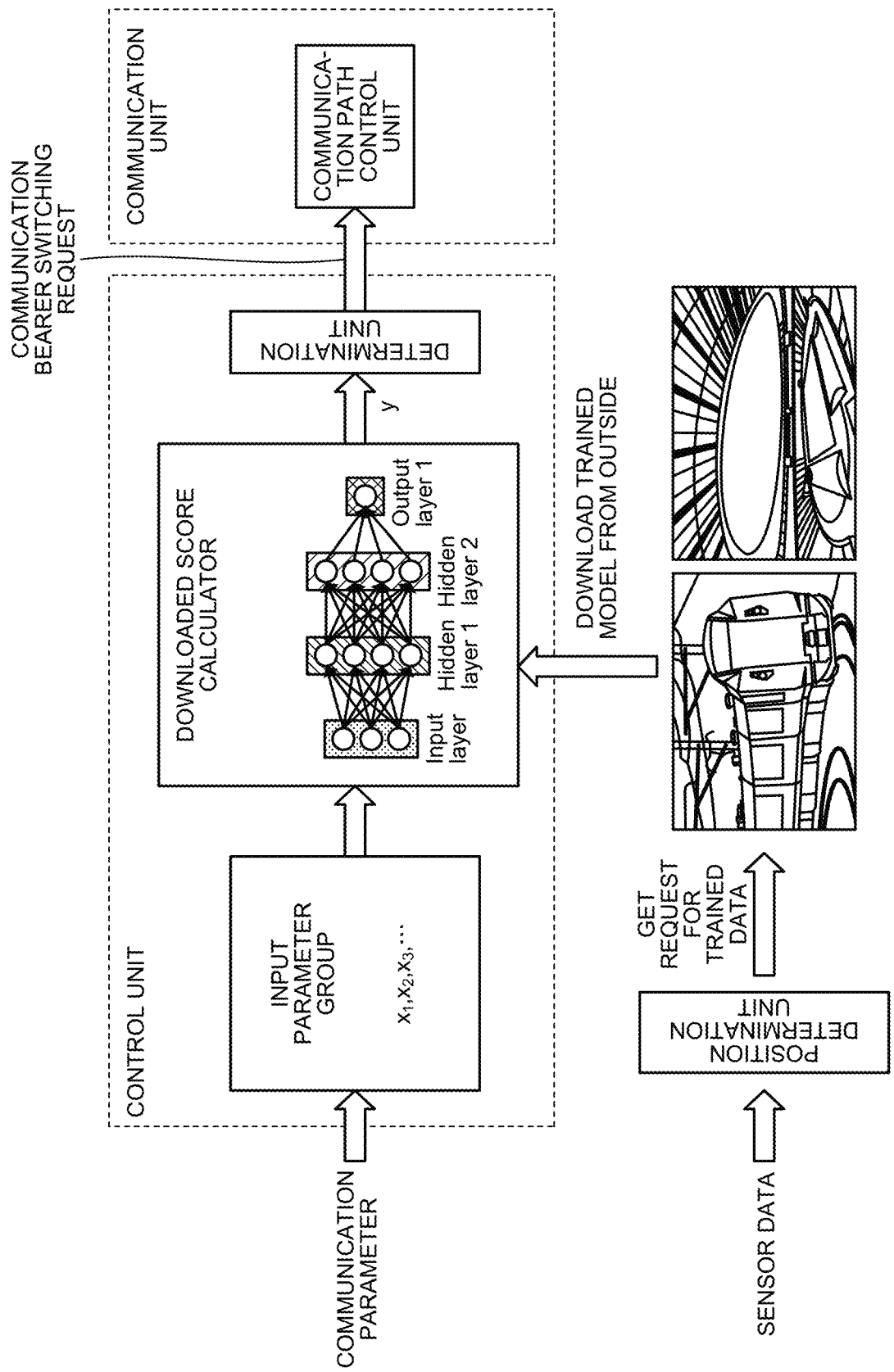
FIG. 19 is a diagram illustrating a configuration example of a determination device according to an embodiment.
Figure 20:
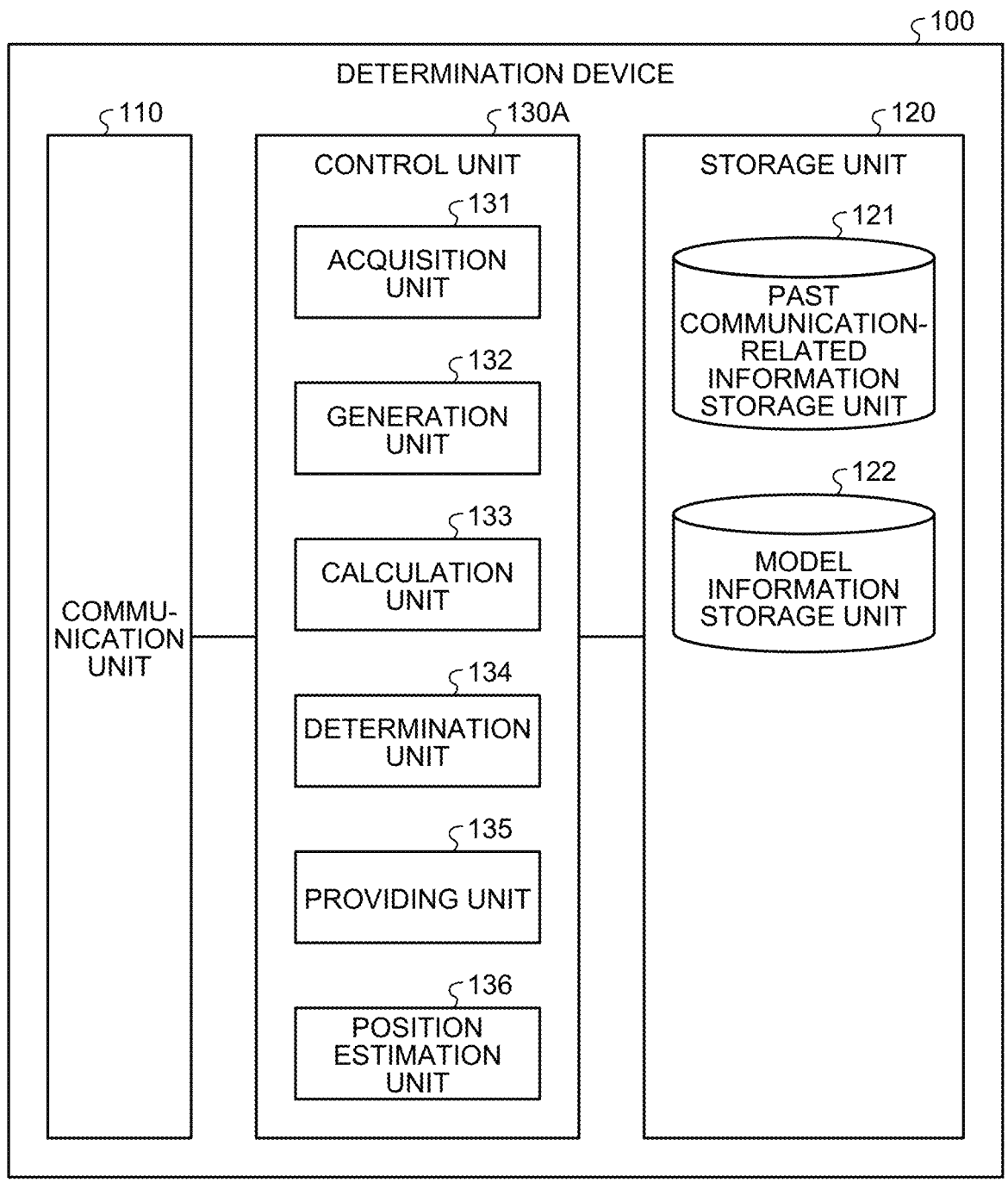
FIG. 20 is a diagram illustrating a configuration example of a determination device according to an embodiment.

FIG. 19 illustrates an example of determination processing according to a fifth modification. The determination device 100 estimates position information of the user on the basis of the sensor data. In this case, the determination device 100 may have a position estimation unit 136 that estimates the position information of the user on the basis of the sensor data. As illustrated in FIG. 20, a control unit 130A may further have the position estimation unit 136. The determination device 100 requests a learning model corresponding to the position information of the user and downloads the learning model from the outside. The determination device 100 calculates the score regarding the communication quality by inputting the communication information to the learning model downloaded from the outside.

Figure 21:
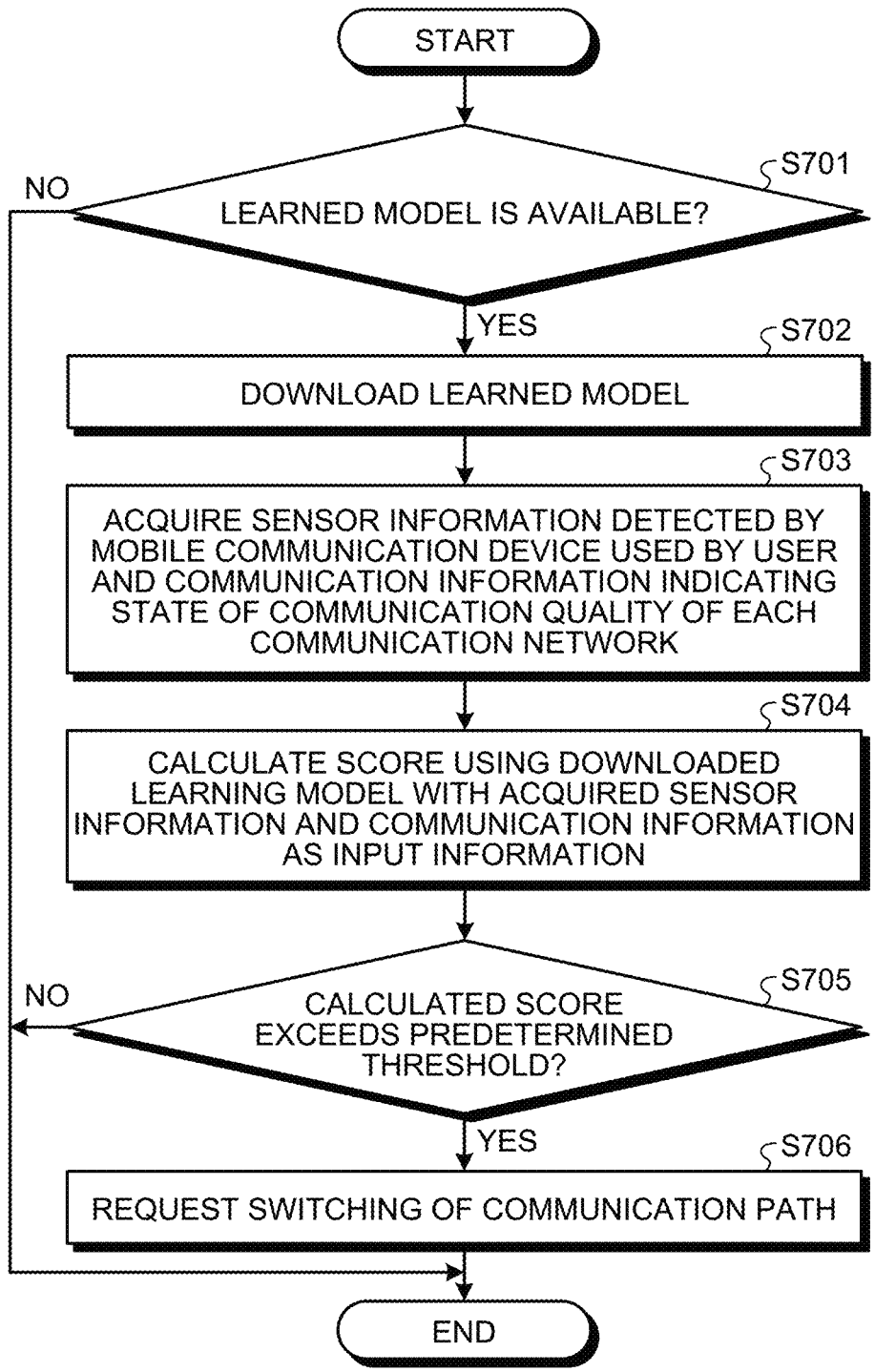
FIG. 21 is a flowchart illustrating an example of information processing according to an embodiment.

Hereinafter, a procedure of information processing by an information processing system 1 according to the fifth modification will be described using FIG. 21. FIG. 21 is a flowchart illustrating the procedure of the information processing by the information processing system 1 according to the fifth modification. The determination device 100 determines whether a learned model is available (Step S701). When the learned model is not available (Step S701; NO), the determination device 100 may end the information processing, or may calculate the score using a default score calculator stored in the terminal device 10 or the determination device 100. When the learned model is available (Step S701; YES), the determination device 100 downloads the learned model from the outside (Step S702). The determination device 100 acquires sensor information detected by the mobile communication device used by the user and communication information indicating a state of communication quality of each communication network (Step S703). The determination device 100 calculates a score by using the downloaded learning model with the acquired sensor information and communication information as input information (Step S704). The determination device 100 determines whether the calculated score exceeds a predetermined threshold (Step S705). When the calculated score does not exceed the predetermined threshold (Step S705; NO), the determination device 100 ends the information processing. When the calculated score exceeds the predetermined threshold (Step S705; YES), the determination device 100 requests switching of the communication path (Step S706). For example, the determination device 100 changes the connected communication network to another network.

[9-6. Sixth Modification (Score Calculation 1 on Cloud)]

In the embodiment described above, the case where the learning model in the terminal device 10 is used has been illustrated. However, the determination device 100 may use an external learning model. Further, in the embodiment according to the fifth modification described above, the case of using the learning model provided by downloading from the outside or the like has been illustrated. However, in the embodiment according to a sixth modification, a case where the determination device 100 uses an external learning model by providing input information to the outside is illustrated. For example, the determination device 100 uses a learning model on a cloud server, a mobile edge computing server, or the like. Note that the outside according to the sixth modification is not limited to the cloud or the mobile edge computing, and may be any medium as long as it is a medium can store a learning model. In this case, the providing unit 135 provides the sensor information and the communication information to a medium outputting a score other than the mobile communication device.

Figure 22:
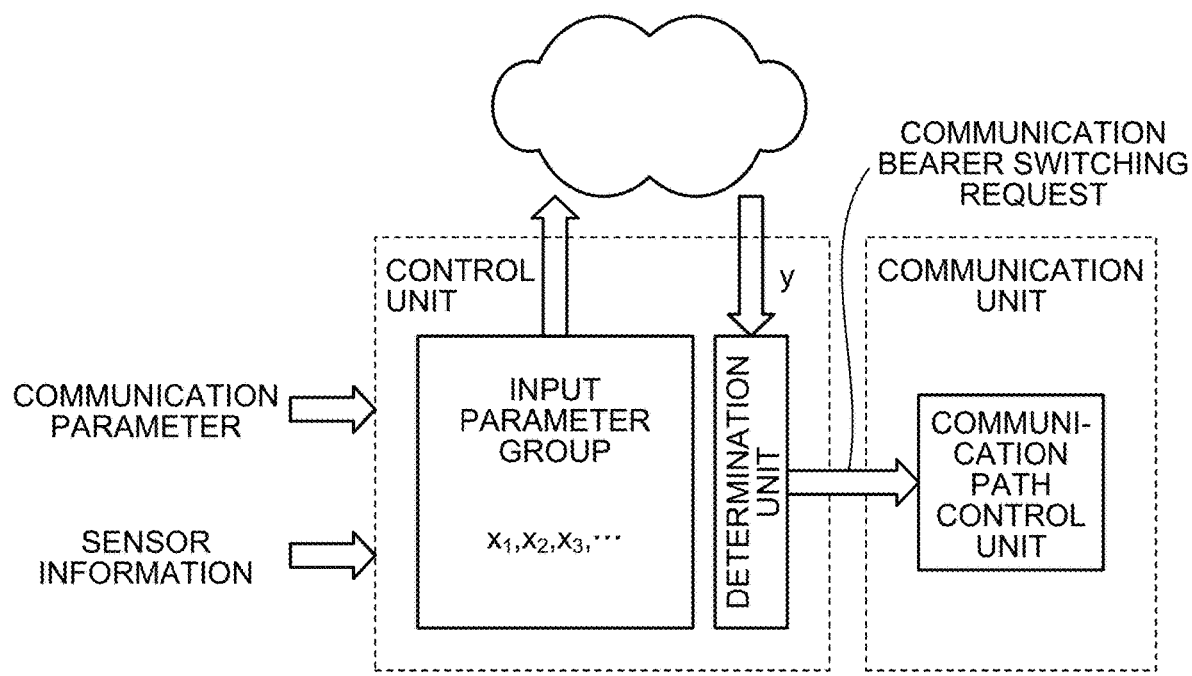
FIG. 22 is a diagram illustrating a configuration example of a determination device according to an embodiment.

An example of determination processing according to the sixth modification will be described using FIG. 22. The determination device 100 uploads the communication information and the sensor information of each bearer acquired from the terminal device 10 to the outside at a predetermined interval. Note that the predetermined interval may be a constant interval such as every several seconds, every several hours, or every several days, or may be an interval varying on the basis of a predetermined condition. For example, the determination device 100 may upload the information to the outside every time an information amount acquired from the terminal device 10 satisfies a predetermined threshold. Further, the uploading to the outside by the determination device 100 may be performed by any format or method, and may be performed by using a JSON format, a REST API, or the like, for example. In this case, the outside outputs the score by using the learning model stored outside with the communication information and the sensor information of each bearer provided from the determination device 100 as input information. In addition, the determination device 100 receives a result output by an external learning model from the outside. The determination device 100 determines whether to switch the bearer of the terminal device 10 by comparing the received score with a predetermined threshold. Furthermore, the determination device 100 may determine whether to switch the bearer of the terminal device 10 by comparing the score calculated on the basis of the received score with the predetermined threshold. For example, the determination device 100 may determine whether to switch the bearer of the terminal device 10 by comparing a score calculated by multiplying the received score by a weight based on a predetermined algorithm with the predetermined threshold. For example, the determination device 100 may determine whether to switch the bearer of the terminal device 10 by comparing a score obtained by calculating the received score and a weight based on the information acquired by the determination device 100 through a predetermined algorithm with a predetermined threshold. When the determination device 100 determines to switch the bearer of the terminal device 10, the determination device 100 requests the communication unit 110 to switch the communication path. For example, the determination device 100 requests the communication path control unit to switch the communication path. As a result, the determination device 100 can realize even large-scale score calculation in which the calculation amount is insufficient in the terminal device 10 by using external calculation resources.

The determination device 100 may determine whether a result provided from the outside and a result output by the determination device 100 deviate from each other. When the score provided from the outside and the score output by the determination device 100 deviate from each other by a predetermined threshold or more, the determination device 100 may determine the switching of the bearer by using the score output by the determination device 100 instead of the score provided from the outside. Further, in a case where times targeted by the input information in the calculation by the outside and the calculation by the determination device 100 are different before and after, the determination device 100 may determine whether the result provided from the outside and the result output by the determination device 100 deviate from each other.

Figure 23:
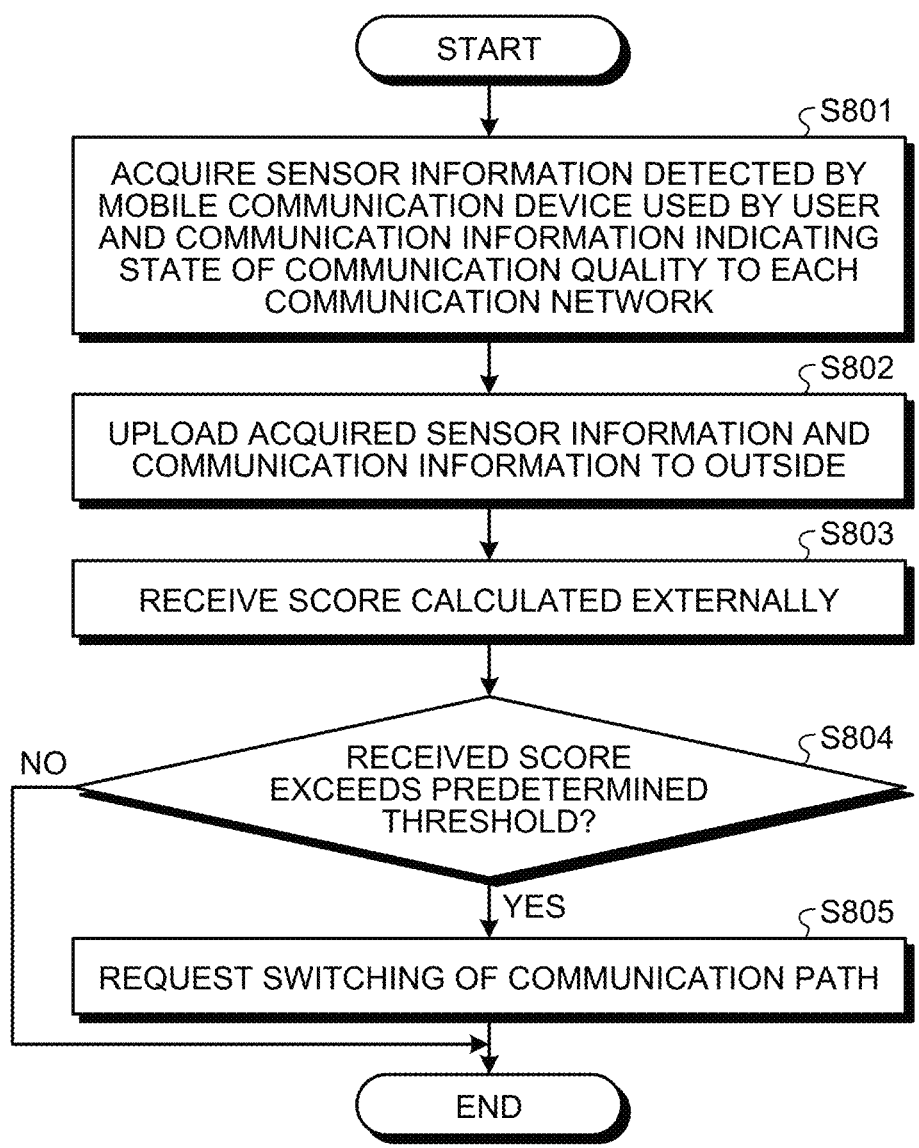
FIG. 23 is a flowchart illustrating an example of information processing according to an embodiment.

Hereinafter, a procedure of information processing by an information processing system 1 according to the sixth modification will be described using FIG. 23. FIG. 23 is a flowchart illustrating the procedure of the information processing by the information processing system 1 according to the sixth modification. The determination device 100 acquires sensor information detected by the mobile communication device used by the user and communication information indicating a state of communication quality of each communication network (Step S801). The determination device 100 uploads the acquired sensor information and communication information to the outside (Step S802). The determination device 100 receives a score calculated externally (Step S803). The determination device 100 determines whether the received score exceeds a predetermined threshold (Step S804). When the received score does not exceed the predetermined threshold (Step S804; NO), the determination device 100 ends the information processing. When the received score exceeds the predetermined threshold (Step S804; YES), the determination device 100 requests switching of the communication path (Step S805).

[9-7. Seventh Modification (Score Calculation 2 on Cloud)

Figure 24:
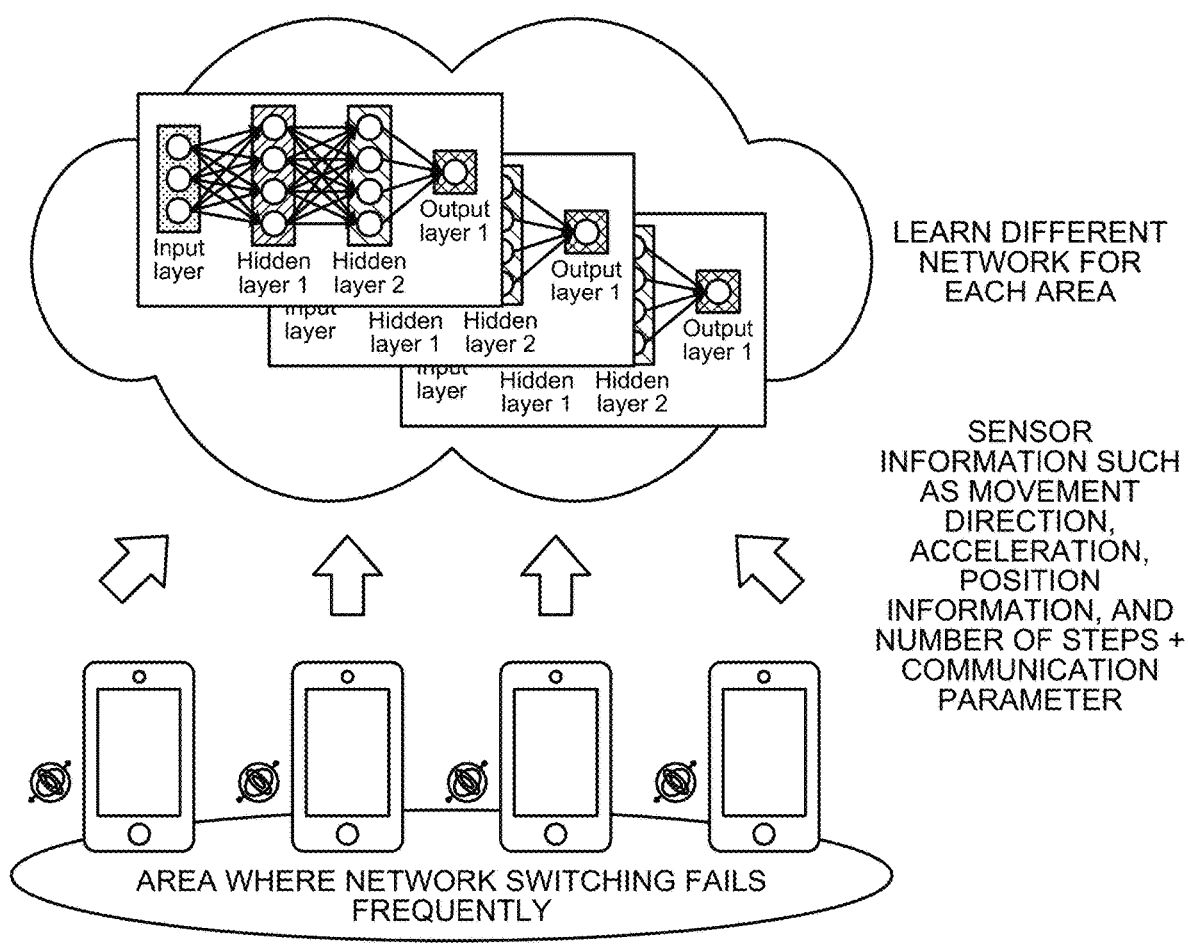
FIG. 24 is a diagram illustrating an example of information processing according to an embodiment.

In the embodiment according to the sixth modification, the case where the learning model stored outside is used has been illustrated. However, in an embodiment according to a seventh modification, a case where a learning model is learned at the outside such as a cloud is illustrated. For example, a score calculator including a single switching model serves as a uniform switching standard, and does not serve as an engine optimized for an action pattern of the user or a place where the user exists. Hereinafter, description of processing similar to that of the sixth modification will be appropriately omitted. An example of determination processing according to the seventh modification will be described below using FIG. 24. When the switching cannot be normally performed in the learning model stored in the terminal device 10, the determination device 100 uploads information (for example, communication information, position information, and information of SSID of the connection destination) when the switching fails to the outside. For example, the determination device 100 records a point of time when a message of a network error output by an application is output and detects a case where the switching cannot be normally performed. Note that the determination device 100 is not limited to the recording of the point of time when the error message is output, and may detect how the switching cannot be normally performed. Specifically, the determination device 100 uploads information based on the network information and the position information in which the error has occurred in a predetermined time from the switching failure. In this case, the outside to be uploaded may learn position information such as the latitude and the longitude as a parameter, or may learn another engine using data uploaded in an area limited to a predetermined area. As a result, since the learning data at the same position gathers, the determination device 100 can realize determination based on information output from a learning model more suitable for the place. In this case, the providing unit 135 provides the sensor information and the communication information to a medium other than the mobile communication device that outputs the score using different learning models learned for each area.

[9-8. Others (Determination Other than Determination by Score)]

In the above embodiment, the case where the switching processing of the communication network is performed according to whether or not the score calculated by the determination device 100 exceeds the predetermined threshold has been illustrated. The determination device 100 is not limited to this example, and may perform the switching processing of the communication network using a specific condition. Specifically, the determination device 100 may perform the switching processing of the communication network by disabling switching to a network defined in advance as a default network so that the communication network is not switched. For example, when at least one of the communication parameters acquired by the acquisition unit 131 does not satisfy a predetermined condition after switching of the communication network as the specific condition, the determination device 100 may perform the switching processing of the communication network such that switching to the default network is not executed again. For example, in a case where the RSSI does not change by a predetermined threshold or more, the determination device 100 may determine that there is no environment change and perform the switching processing of the communication network so that the switching to the default network is not executed again. As a result, since the determination device 100 can prevent chattering that repeats switching, the determination device 100 can perform more advanced switching control of the communication network. As a result, the determination device 100 can achieve an effect in which a fail safe is installed.

10. Hardware Configuration

Figure 25:
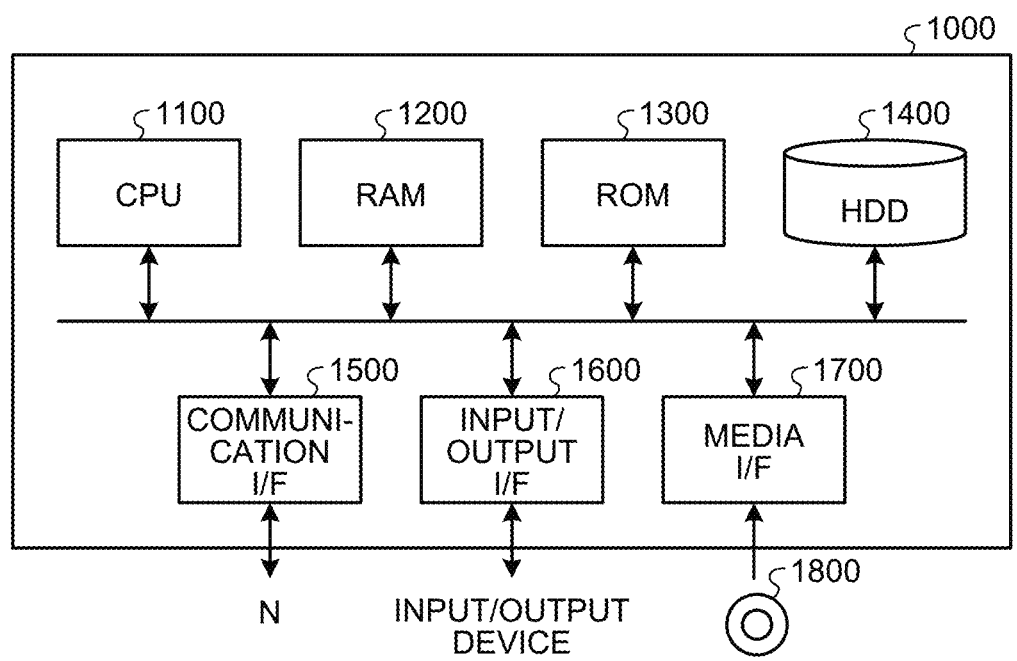
FIG. 25 is a hardware configuration diagram illustrating an example of a computer for realizing a function of a determination device.

Further, the terminal device 10, the information providing device 50, and the determination device 100 according to the above-described embodiment are realized by a computer 1000 having a configuration illustrated in FIG. 25, for example. FIG. 25 is a hardware configuration diagram illustrating an example of a computer that realizes the functions of the terminal device 10, the information providing device 50, and the determination device 100. The computer 1000 has a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400 and controls each unit. The ROM 1300 stores a boot program executed by the CPU 1100 when the computer 1000 starts, a program depending on hardware of the computer 1000, and the like.

The HDD 1400 stores a program executed by the CPU 1100, data used by the program, and the like. The communication interface 1500 receives data from another device via a predetermined communication network, sends the data to the CPU 1100, and transmits data generated by the CPU 1100 to another device via the predetermined communication network.

The CPU 1100 controls an output device such as a display or a printer and an input device such as a keyboard or a mouse via the input/output interface 1600. The CPU 1100 acquires data from the input device via the input/output interface 1600. In addition, the CPU 1100 outputs the generated data to the output device via the input/output interface 1600.

The media interface 1700 reads a program or data stored in a recording medium 1800 and provides the program or data to the CPU 1100 via the RAM 1200. The CPU 1100 loads the program from the recording medium 1800 onto the RAM 1200 via the media interface 1700, and executes the loaded program. The recording medium 1800 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the terminal device 10, the information providing device 50, and the determination device 100 according to the embodiment, the CPU 1100 of the computer 1000 realizes the functions of the control units 14, 53, and 130 by executing a program loaded on the RAM 1200. The CPU 1100 of the computer 1000 reads these programs from the recording medium 1800 and executes the programs. However, as another example, the CPU 1100 may acquire these programs from another device via a predetermined communication network.

11. Others

Further, all or a part of the processing described as being automatically performed among the processing described in the above embodiment and modifications can be manually performed, or all or a part of the processing described as being manually performed can be automatically performed by a known method. In addition, the processing procedure, specific name, and information including various data and parameters illustrated in the document and the drawings can be arbitrarily changed unless otherwise specified. For example, the various types of information illustrated in each drawing are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, use conditions, and the like.

In addition, the above-described embodiment and modifications can be appropriately combined within a range that does not contradict processing contents.

Although some of the embodiments of the present application have been described in detail on the basis of the drawings, these are merely examples, and the present invention can be implemented in other forms subjected to various modifications and improvements based on the knowledge of those skilled in the art, including the aspects described in the disclosure of the invention.

In addition, the "part (section, module, or unit)" described above can be replaced with a "mechanism", a "circuit", or the like. For example, the acquisition unit can be replaced with an acquisition mechanism or an acquisition circuit.

Note that the present technology can also take the following configurations.

(1)

A determination device comprising:

a communication unit that selectively connects to and communicates with a plurality of communication networks;

an acquisition unit that acquires sensor information detected by a mobile communication device used by a user and communication information indicating a state of communication quality to each communication network; and a determination unit that determines whether to switch to another communication network among the plurality of communication networks, on the basis of the sensor information and the communication information acquired by the acquisition unit.

(2)

The determination device according to (1), wherein the determination unit determines whether to switch to the another communication network, on the basis of sensor information indicating a state of the user in the sensor information acquired by the acquisition unit.

(3)

The determination device according to (1) or (2), wherein the determination unit determines whether to switch to the another communication network, on the basis of sensor information indicating a movement speed of the user.

(4)

The determination device according to any one of (1) to (3), wherein the determination unit determines whether to switch to the another communication network, on the basis of context information of the user estimated on the basis of a state of the user in the sensor information acquired by the acquisition unit.

(5)

The determination device according to any one of (1) to (4), wherein the plurality of communication networks include a wireless LAN network via a wireless LAN base station and a cellular network via a cellular communication base station, and the determination unit determines whether to switch the wireless LAN network to the cellular network, on the basis of the communication information of communication performed via the wireless LAN network.

(6)

The determination device according to (5), wherein the determination unit determines whether to switch to the another communication network, on the basis of at least one of RSSI, LinkSpeed, or a packet communication state as the communication information.

(7)
The determination device according to any one of (1) to (6), wherein
the determination unit determines whether to switch to the another communication network using a learning model outputting a score indicating a scale of whether or not to execute switching of the communication network with at least one of the communication information and the sensor information as input information.

(8)
The determination device according to any one of (1) to (7), wherein
the determination unit determines whether to switch to the another communication network using a learning model outputting a score regarding communication quality of each communication network with at least one of the communication information and the sensor information as input information.

(9)
The determination device according to any one of (1) to (8), wherein
the determination unit determines whether to switch to the another communication network using a plurality of learning models outputting scores corresponding to respective communication networks with at least one of the communication information and the sensor information as input information.

(10)
The determination device according to (9), wherein
the determination unit uses the plurality of learning models to determine to switch to a communication network having the maximum score among the plurality of communication networks.

(11)
The determination device according to any one of (1) to (10), wherein
the determination unit determines to switch to a communication network having a minimum delay amount based on a throughput among the plurality of communication networks.

(12)
The determination device according to any one of (1) to (11), further comprising:
a providing unit that provides the sensor information and the communication information acquired by the acquisition unit to a device other than the mobile communication device outputting the score, wherein
the determination unit determines whether to switch to the another communication network, on the basis of the score calculated by a device other than the mobile communication device.

(13)
The determination device according to (12), wherein
the providing unit provides the sensor information and the communication information acquired by the acquisition unit to a device other than the mobile communication device outputting the score using the different learning model learned for each area.

(14)
The determination device according to (5), wherein
the cellular network is a communication network conforming to a fifth-generation communication standard.

(15)
The determination device according to (5), wherein
the cellular network is a communication network conforming to millimeter wave communication in a fifth generation.

(16)
A determination method comprising:
causing a computer to selectively connect to and communicate with a plurality of communication networks;
causing the computer to acquire sensor information detected by a mobile communication device used by a user and communication information to each communication network; and
causing the computer to determine whether to switch to another communication network among the plurality of communication networks, on the basis of the acquired sensor information and communication information.

(17)
A determination program for causing a computer to:
selectively connect to and communicate with a plurality of communication networks;
acquire sensor information detected by a mobile communication device used by a user and communication information to each communication network; and
determine whether to switch to another communication network among the plurality of communication networks, on the basis of the acquired sensor information and communication information.

REFERENCE SIGNS LIST

1 INFORMATION PROCESSING SYSTEM
10 TERMINAL DEVICE
50 INFORMATION PROVIDING DEVICE
100 DETERMINATION DEVICE
110 COMMUNICATION UNIT
111 COMMUNICATION PATH CONTROL UNIT
120 STORAGE UNIT
121 PAST COMMUNICATION-RELATED INFORMATION STORAGE UNIT
122 MODEL INFORMATION STORAGE UNIT
130 CONTROL UNIT
131 ACQUISITION UNIT
1311 COMMUNICATION PARAMETER ACQUISITION UNIT
1312 SENSOR INFORMATION ACQUISITION UNIT
132 GENERATION UNIT
133 CALCULATION UNIT
134 DETERMINATION UNIT
135 PROVIDING UNIT
136 POSITION ESTIMATION UNIT
N NETWORK

The invention claimed is:
1. A determination device comprising:
a transceiver; and
control circuitry configured to:
selectively connect to and communicate with one of a plurality of communication networks via the transceiver,
wherein the plurality of communication networks comprise one or more LTE networks, one or more 5G Sub 6 networks, one or more 5G mmWave networks and one or more WiFi networks;
acquire both:
sensor information, the sensor information including:
information regarding a current position and speed of a user that is detected by a mobile communication device being used by the user,
information about a future position and speed of the user that is inferred by the mobile communication device, and information about a time related to downloading information by the user via the mobile communication device, and communication network specific communication information indicating a state of communication quality of a respective one of the plurality of communication networks; and determine whether to switch from a current communication network of the plurality of communication networks to another communication network among the plurality of communication networks, on the basis of the acquired sensor information and the acquired communication information, wherein the current communication network is one of the one or more LTE networks, the one or more 5G Sub 6 networks, the one or more 5G mm Wave networks or the one or more WiFi networks, wherein the another communication network is a different one of the one or more LTE networks, the one or more 5G Sub 6 networks, the one or more 5G mm Wave networks or the one or more WiFi networks, wherein the control circuitry:

determines whether to switch from the current communication network to the another communication network based on a plurality of learning models respectively corresponding to the plurality of communication networks, each of the plurality of learning models outputting scores that are generated based on the acquired communication information and the acquired sensor information, upon determining whether to switch from the current communication network to the another communication network, uses the plurality of learning models to select, as the another communication network, a communication network among the plurality of communication networks having a maximum score of the scores that are output from the plurality of learning models, and switches from the current communication network to the selected communication network.

2. The determination device according to claim 1, wherein for each of the plurality of communication networks, the corresponding communication network specific communication information comprises at least one of a received signal strength indicator (RSSI), a LinkSpeed, or a packet communication state.

3. The determination device according to claim 1, wherein the selected communication network is a communication network among the plurality of communication networks having a minimum downloading delay.

4. A determination method performed by a device and comprising:

selectively connecting to and communicating with one of a plurality of communication networks, wherein the plurality of communication networks comprise one or more LTE networks, one or more 5G Sub 6 networks, one or more 5G mmWave networks and one or more WiFi networks;

acquiring both:

sensor information, the sensor information including:

information regarding a current position and speed of a user that is detected by a mobile communication device being used by the user, information about a future position and speed of the user that is inferred by the mobile communication device, and information about a time related to downloading information by the user via the mobile communication device, and communication network specific communication information indicating a state of communication quality of a respective one of the plurality of communication networks; and determining whether to switch from a current communication network of the plurality of communication networks to another communication network among the plurality of communication networks, on the basis of the acquired sensor information and acquired communication information, wherein the current communication network is one of the one or more LTE networks, the one or more 5G Sub 6 networks, the one or more 5G mm Wave networks or the one or more WiFi networks, wherein the another communication network is a different one of the one or more LTE networks, the one or more 5G Sub 6 networks, the one or more 5G mmWave networks or the one or more WiFi networks, wherein the method further comprises:

determining whether to switch from the current communication network to the another communication network based on a plurality of learning models respectively corresponding to the plurality of communication networks, each of the plurality of learning models outputting scores that are generated based on the acquired communication information and the acquired sensor information, upon determining whether to switch from the current communication network to the another communication network, using the plurality of learning models to select, as the another communication network, a communication network among the plurality of communication networks having a maximum score of the scores that are output from the plurality of learning models, and switching from the current communication network to the selected communication network.

5. A non-transitory computer product containing a determination program for causing a computer to:

selectively connecting to and communicating with one of a plurality of communication networks, wherein the plurality of communication networks comprise one or more LTE networks, one or more 5G Sub 6 networks, one or more 5G mmWave networks and one or more WiFi networks;

acquiring both:

information regarding a current position and speed of a user that is detected by a mobile communication device being used by the user, information about a future position and speed of the user that is inferred by the mobile communication device, and information about a time related to downloading information by the user via the mobile communication device, and communication network specific communication information indicating a state of communication quality of a respective one of the plurality of communication networks; and determining whether to switch from a current communication network of the plurality of communication networks to another communication network among the plurality of communication networks, on the basis of the acquired sensor information and acquired communication information, wherein the current communication network is one of the one or more LTE networks, the one or more 5G Sub 6 networks, the one or more 5G mm Wave networks or the one or more WiFi networks, wherein the another communication network is a different one of the one or more LTE networks, the one or more 5G Sub 6 networks, the one or more 5G mm Wave networks or the one or more WiFi networks, wherein the method further comprises:

determining whether to switch from the current communication network to the another communication network based on a plurality of learning models respectively corresponding to the plurality of communication networks, each of the plurality of learning models outputting scores that are generated based on the acquired communication information and the acquired sensor information, upon determining whether to switch from the current communication network to the another communication network, using the plurality of learning models to select, as the another communication network, a communication network among the plurality of communication networks having a maximum score of the scores that are output from the plurality of learning models, and switching from the current communication network to the selected communication network.

* * * * *